(12) United States Patent
Mizunuma et al.

(10) Patent No.: US 11,894,874 B2
(45) Date of Patent: Feb. 6, 2024

(54) COMMUNICATION NETWORK SYSTEM AND LIGHTING FIXTURE

(71) Applicant: Murata Manufacturing Co., Ltd., Kyoto (JP)

(72) Inventors: Ryuken Mizunuma, Kyoto (JP); Satoshi Tanaka, Kyoto (JP); Yasuhisa Yamamoto, Kyoto (JP); Akiko Itabashi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 93 days.

(21) Appl. No.: 17/317,087

(22) Filed: May 11, 2021

(65) Prior Publication Data
US 2021/0359758 A1 Nov. 18, 2021

(30) Foreign Application Priority Data
May 13, 2020 (JP) ................................ 2020-084778

(51) Int. Cl.
*H04B 10/2575* (2013.01)
*H04B 7/15* (2006.01)

(52) U.S. Cl.
CPC ........... *H04B 10/2575* (2013.01); *H04B 7/15* (2013.01); *H04B 10/25752* (2013.01)

(58) Field of Classification Search
None
See application file for complete search history.

(56) References Cited

U.S. PATENT DOCUMENTS

| 6,052,087 A * | 4/2000 | Ishikawa ................ H01Q 13/10 333/202 |
| 2009/0081947 A1* | 3/2009 | Margis ................. H04B 1/3822 455/3.02 |
| 2014/0351867 A1 | 11/2014 | Hommel et al. |
| 2016/0227415 A1 | 8/2016 | Carswell |
| 2018/0027389 A1* | 1/2018 | Shirakata ................ H04L 69/14 455/426.1 |
| 2018/0076891 A1* | 3/2018 | Agrawal ................. H04W 4/02 |
| 2018/0206161 A1* | 7/2018 | Lou .......................... H04L 5/143 |

FOREIGN PATENT DOCUMENTS

| JP | 2004096608 A * | 3/2004 |
| JP | 2011-504664 A | 2/2011 |
| JP | 2012-044375 A | 3/2012 |
| JP | 2015-506120 A | 2/2015 |
| JP | 2018-014054 A | 1/2018 |
| JP | 2018-509055 A | 3/2018 |

OTHER PUBLICATIONS

Partial human translation of JP 2004-096608, paragraphs [0022]-[0023] and [0035]-[0037].

* cited by examiner

*Primary Examiner* — David W Lambert
(74) *Attorney, Agent, or Firm* — Pearne & Gordon LLP

(57) ABSTRACT

A communication network system is a communication network system that distributes information to a plurality of terminals inside a closed space. The communication network system includes a network server and a plurality of lighting fixtures each having an antenna that transmits and receives millimeter-wave-band communication signals to and from the terminals.

18 Claims, 23 Drawing Sheets

COMMUNICATION NETWORK SYSTEM AND LIGHTING FIXTURE

CROSS REFERENCE TO RELATED APPLICATION

This application claims priority from Japanese Patent Application No. 2020-084778 filed on May 13, 2020. The content of this application is incorporated herein by reference in its entirety.

BACKGROUND

The present disclosure relates to a communication network system and a lighting fixture.

In passenger transportation services, such as those involving airplanes and ships, distribution of images, information, and so forth is provided inside a cabin. In this type of service providing images and information, a display device and so forth have been installed in each seat inside a cabin. However, in recent years, in order to reduce the weight of passenger planes and to reduce the maintenance and operational costs of systems, seat displays have been phased out, and as an alternative, systems that provide images and information to the personal terminals of passengers have been introduced.

Existing WLAN networks used in passenger planes and the like have a limited number of access points and therefore cannot simultaneously handle a large number of radio links. Therefore, for example, entertainment networks that provide entertainment services by using ISM radio frequency bands (hereinafter, also referred to as "ISM bands") have been disclosed (for example, refer to Japanese Unexamined Patent Application Publication (Translation of PCT Application) No. 2015-506120).

ISM bands with carrier frequencies of 2.4 GHz and 5 GHz have advantages that the propagation distance is long and the number of base stations (access points: APs) is small, but the risk of propagation to outside an aircraft or ship is an issue when providing entertainment services inside a cabin. In addition, it may not be possible to realize sufficient transmission speeds in passenger transportation services, such as those involving airplanes and ships having large numbers of passengers.

BRIEF SUMMARY

The present disclosure provides a communication network system and a lighting fixture capable of providing a high-speed and large-capacity information distribution service to a large number of terminals inside a closed space while suppressing the risk of propagation to outside the closed space.

A communication network system of an aspect of the present disclosure is a communication network system that distributes information to a plurality of terminals inside a closed space. The communication network system includes a network server and a plurality of lighting fixtures that each includes an antenna that transmits and receives millimeter-wave-band communication signals to and from the terminals.

With this configuration, a high-speed and large-capacity information distribution service can be distributed to a large number of terminals inside the closed space while suppressing risk of propagation to outside the closed space.

A lighting fixture of an aspect of the present disclosure includes a light-emitting element, a cover that allows light emitted by the light-emitting element to pass therethrough, a plurality of antennas that are provided so that radiating surfaces thereof face the cover and that transmit and receive millimeter-wave-band communication signals to and from a terminal, and a base member to which the cover is fixed.

With this configuration, a high-speed and large-capacity information distribution service can be distributed with a lighting fixture serving as a base station.

According to the present disclosure, there can be provided a communication network system and a lighting fixture capable of providing a high-speed and large-capacity information distribution service to a large number of terminals inside a closed space while suppressing the risk of propagation to outside the closed space.

Other features, elements, characteristics and advantages of the present disclosure will become more apparent from the following detailed description of embodiments of the present disclosure with reference to the attached drawings.

DETAILED DESCRIPTION

Hereafter, communication network systems and lighting fixtures according to embodiments will be described in detail on the basis of the drawings. The present disclosure is not limited by the embodiments. Each embodiment is an illustrative example and it goes without necessarily saying that parts of the configurations illustrated in different embodiments can be substituted for one another or combined with one another.

Embodiment 1

Figure 1:
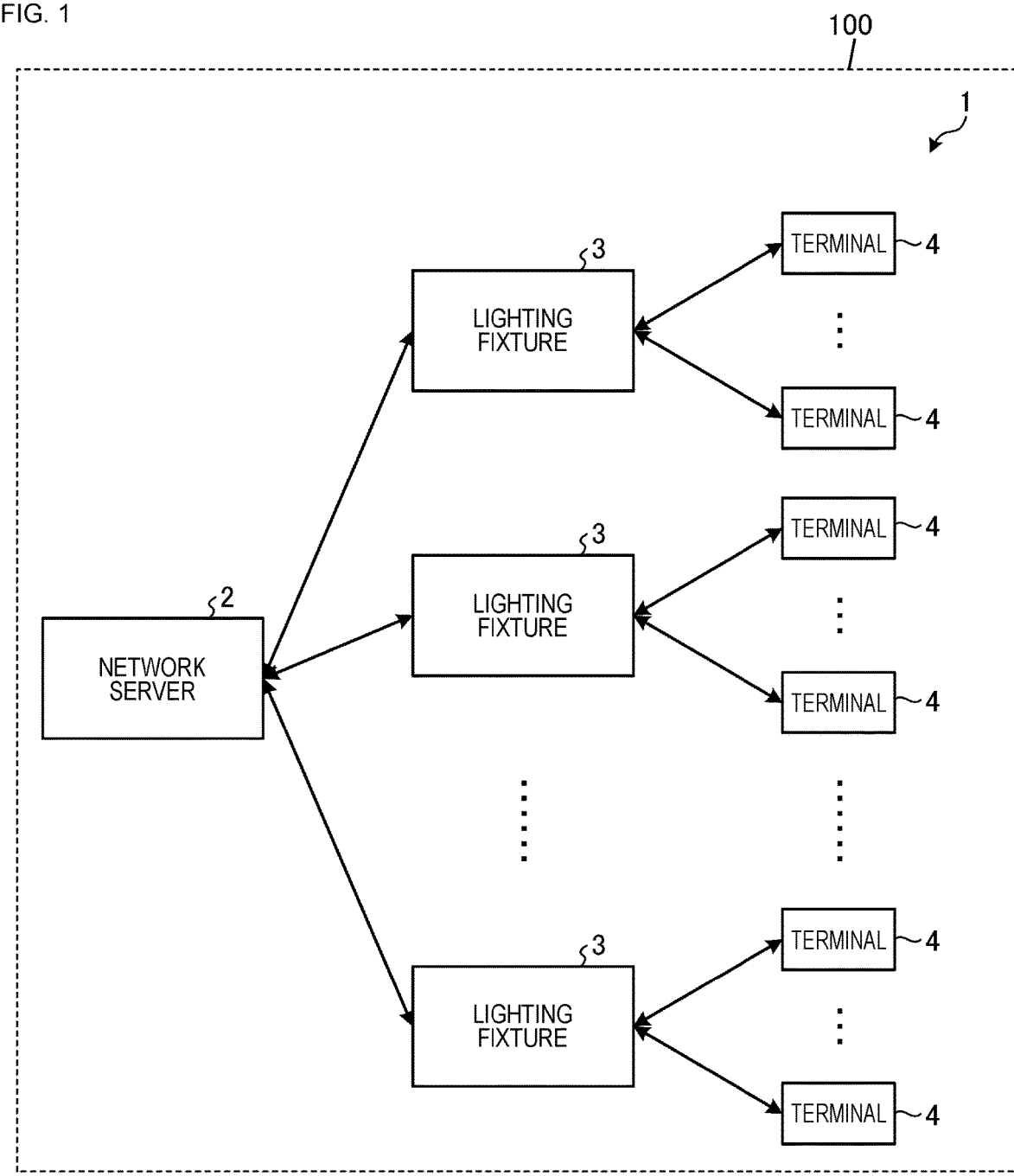
FIG. 1 is a schematic diagram illustrating the basic configuration of a communication network system according to Embodiment 1.

FIG. 1 is a schematic diagram illustrating the basic configuration of a communication network system according to Embodiment 1.

As illustrated in FIG. 1, a communication network system 1 according to this embodiment includes a network server 2 serving as a parent station and a plurality of lighting fixtures 3 each having a base station function.

Each lighting fixture 3 and each corresponding terminal 4 transmits and receives millimeter-wave-band communication signals therebetween at, for example, 1 Gbps. For example, a fifth generation mobile communication system (5G) and a Wireless Gigabit (WiGig) (registered trademark) system are examples of communication systems that can be used to transmit and receive millimeter-wave-band communication signals between each lighting fixture 3 and the corresponding terminals 4. In this disclosure, the term "millimeter waves" includes quasi-millimeter waves and millimeter waves. The frequency of millimeter wave communication is 24 GHz to 90 GHz, for example.

The communication network system 1 according to Embodiment 1 distributes information to a plurality of terminals 4 inside a closed space 100. In this disclosure, the closed space 100 is, for example, the internal space of the fuselage of a passenger plane or the internal space of the hull of a passenger ship. Specifically, the communication network system 1 according to Embodiment 1 provides an information distribution service to the terminals 4 which are, for example, portable information terminals, such as tablets and smartphones owned by the passengers inside the cabin of a passenger plane or a passenger ship or information terminals installed in the seats inside the cabin of a passenger plane or a passenger ship. The closed space 100 is not limited to be the cabin of a passenger plane or a passenger ship and may instead be a space partitioned from the outside by a floor, a ceiling, and walls (for example, a general room).

The risk of propagation to outside the closed space 100 is an issue in an information distribution service used inside the closed space 100. In an ISM band having a carrier frequency of, for example, 2.4 GHz or 5 GHz, a sufficient band width cannot be secured to provide an information distribution service to a large number of terminals 4 inside the closed space 100. In the present disclosure, a high-speed and large-capacity information distribution service can be provided to a large number of terminals 4 inside the closed space 100 while suppressing the risk of propagation to outside the closed space 100 due to millimeter-wave-band communication signals being transmitted and received between each lighting fixture 3 and the corresponding terminals 4.

Figure 2A:
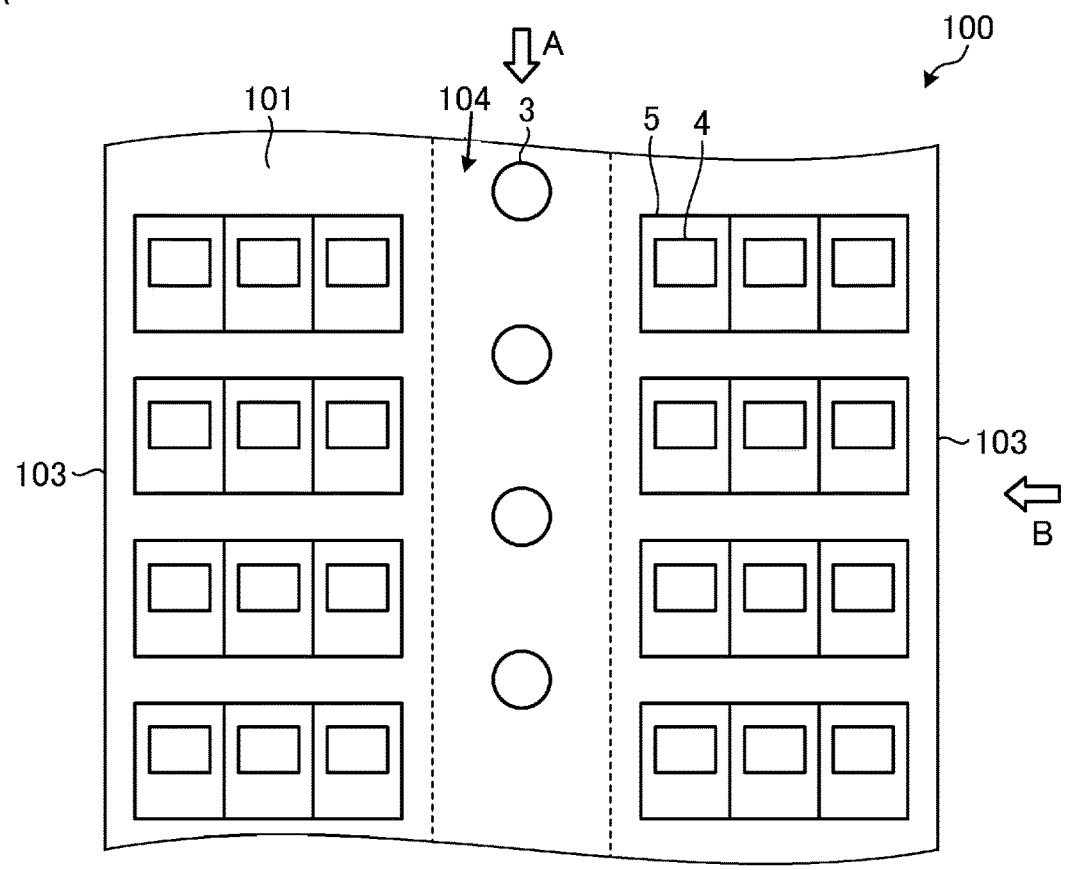
FIG. 2A is a diagram illustrating an example layout in a closed space of the communication network system according to Embodiment 1.
Figure 2B:
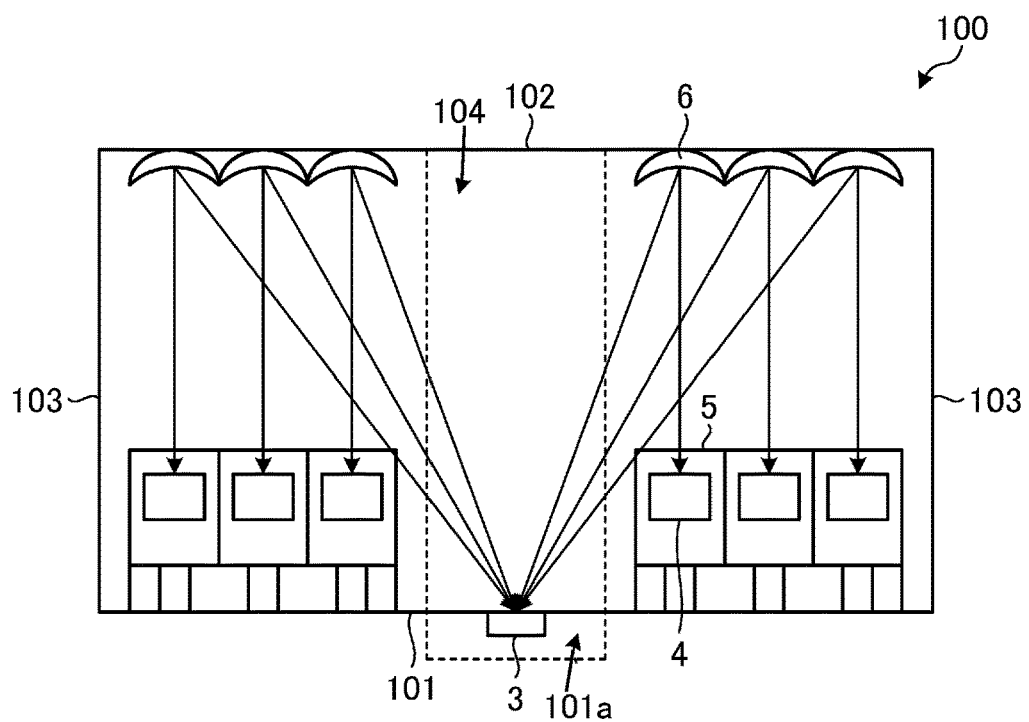
FIG. 2B is a diagram illustrating the example layout in the closed space of the communication network system according to Embodiment 1.
Figure 2C:
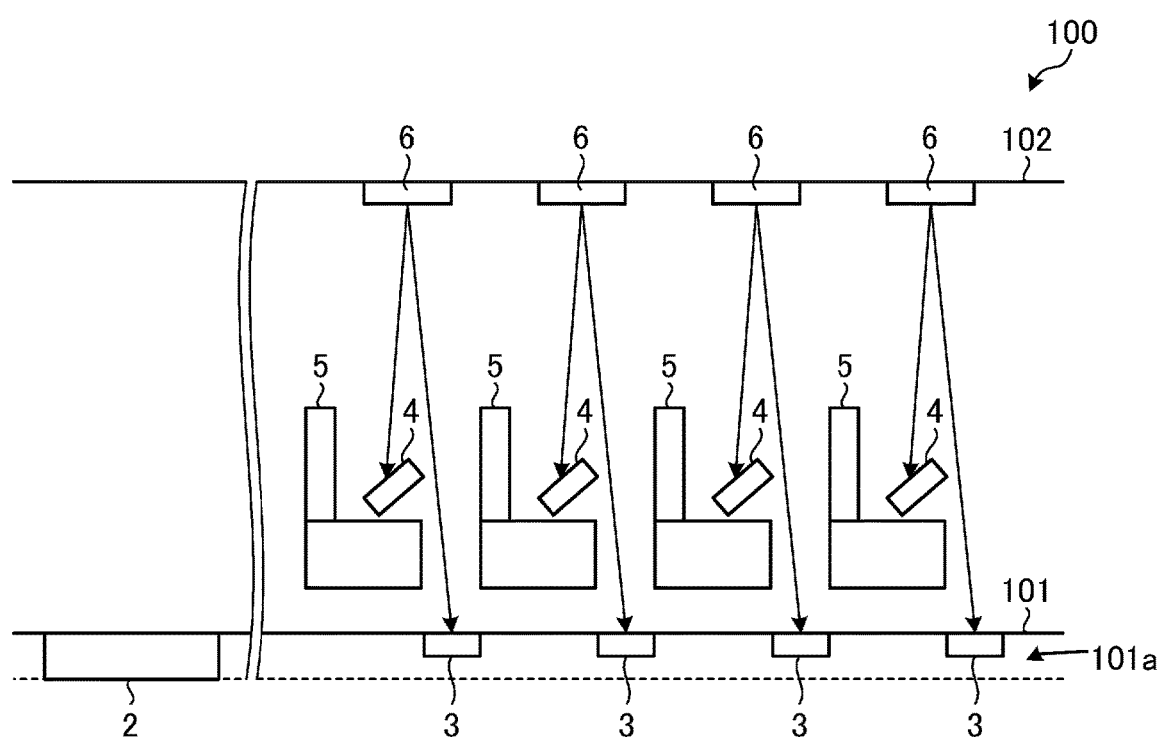
FIG. 2C is a diagram illustrating the example layout in the closed space of the communication network system according to Embodiment 1.

FIGS. 2A, 2B, and 2C are diagrams illustrating an example layout in the closed space 100 of the communication network system 1 according to Embodiment 1. In FIGS. 2A, 2B, and 2C, the closed space 100 is assumed to be the cabin of a passenger plane. FIG. 2A is a top view of the cabin of the passenger plane. FIG. 2B is a front view in which the cabin of the passenger plane illustrated in FIG. 2A is viewed in the direction of arrow A. FIG. 2C is a side view in which the cabin of the passenger plane illustrated in FIG. 2A is viewed in the direction of arrow B. Hereafter, the closed space 100 is also referred to as a "cabin 100".

As illustrated in FIGS. 2A, 2B, and 2C, the cabin 100 is a closed space surrounded by a floor 101, a ceiling 102, and walls 103. In the example illustrated in FIGS. 2A, 2B, and 2C, walls at the front (upper side in FIG. 2A) and the rear (lower side in FIG. 2A) are omitted.

In this embodiment, as illustrated in FIGS. 2A, 2B, and 2C, a plurality of lighting fixtures 3 are embedded in a space 101a provided in the floor 101 of an aisle 104 of the cabin 100. In the mode illustrated in FIGS. 2A, 2B, and 2C, for example, the lighting fixtures 3 are exemplified by emergency lights in the cabin 100.

In the example illustrated in FIGS. 2A, 2B, and 2C, the lighting fixtures 3 are provided so as to each correspond to a plurality of seats 5 arrayed in the lateral direction illustrated in FIG. 2A. A reflector 6 formed of a dielectric is provided on the ceiling 102 above each seat 5. Radio waves radiated from the lighting fixtures 3 undergo beam forming by the reflectors 6 and reach the terminals 4 of the individual seats 5. The reflectors 6 may each have a configuration in which structures that are very small relative to the wavelength of the radio waves radiated from the lighting fixture 3 are disposed in an array pattern.

The lighting fixtures 3 transmit and receive communication signals to and from the network server 2, which is provided in the space 101a. The network server 2 and the lighting fixtures 3 transmit and receive, for example, 40 Gbps optical communication or millimeter-wave-band communication signals.

Figure 3A:
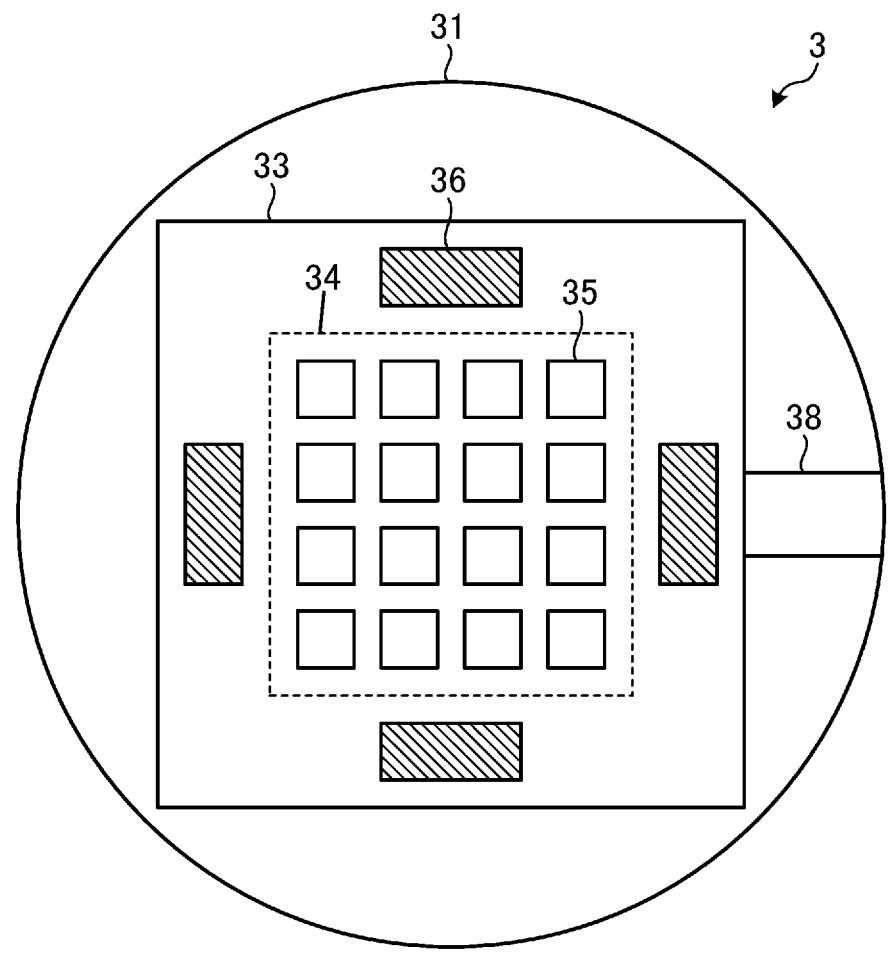
FIG. 3A is a diagram illustrating an example of a lighting fixture according to Embodiment 1.
Figure 3B:
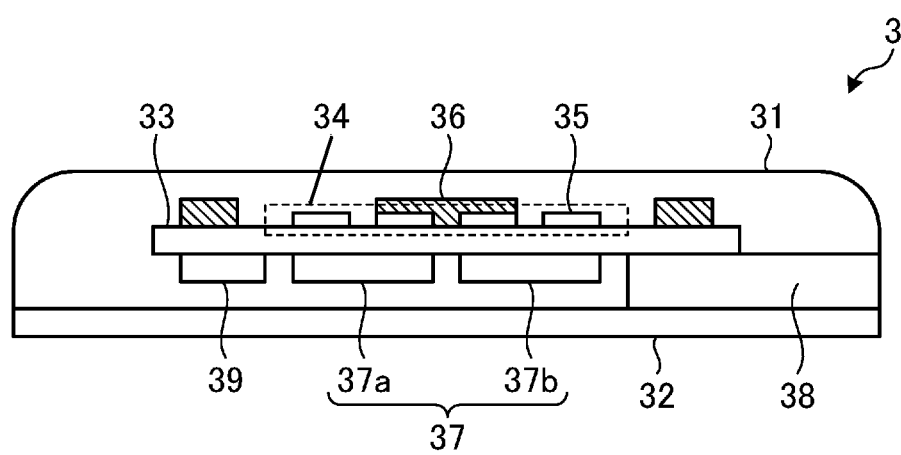
FIG. 3B is a diagram illustrating the example of the lighting fixture according to Embodiment 1.

FIGS. 3A and 3B are diagrams illustrating an example of a lighting fixture according to Embodiment 1. FIG. 3A corresponds to the top view illustrated in FIG. 2A. FIG. 3B corresponds to the side view illustrated in FIG. 2C. In the configuration illustrated in FIGS. 3A and 3B, the lighting fixture 3 transmits and receives optical communication signals to and from the network server 2.

The lighting fixture 3 includes light-emitting elements 36, a cover 31 that allows light emitted by the light-emitting elements 36 to pass therethrough, an antenna 34 that is provided so that a radiating surface thereof faces the cover 31 and that transmits and receives millimeter-wave-band communication signals to and from the terminals 4, and a base member 32 to which the cover 31 is fixed.

Specifically, as illustrated in FIGS. 3A and 3B, in the lighting fixture 3, the antenna 34, which transmits and receives millimeter-wave-band communication signals to and from the terminals 4, and the light-emitting elements 36 are provided on the same dielectric substrate 33. The light-emitting elements 36 can be surface-mount-type light-emitting elements. By using surface-mount-type light-emitting elements, the height of the light-emitting elements 36 can be reduced, thereby preventing the light-emitting elements 36 from interfering with propagation of radio waves by the antenna 34.

The antenna 34 is an array antenna in which a plurality of patch antennas 35 are arrayed on the surface of the dielectric substrate 33. The patch antennas 35 are radiating conductors provided on the surface of the dielectric substrate 33. In the antenna 34, for example, the plurality of patch antennas 35 provided on the dielectric substrate 33 are arrayed in a matrix pattern. Radio waves are radiated from the surface (radiating surface) of the dielectric substrate 33 on which the antenna 34 is provided. Although an example is illustrated in FIGS. 3A and 3B in which the numbers of rows and columns of the patch antennas 35 are 4×4, the numbers of rows and columns of patch antennas 35 are not limited to this example.

The light-emitting elements 36 are, for example, formed of light-emitting diodes (LEDs). An example is illustrated in FIGS. 3A and 3B in which four light-emitting elements 36 are provided on the dielectric substrate 33 so as to surround the antenna 34. When the plurality of patch antennas 35 are surrounded by the light-emitting elements 36 in plan view, a space for constructing the array can be easily formed in the part surrounded by the light-emitting elements 36, and as a result, more subtle control of directivity is possible. An example in which four light-emitting elements 36 are provided on the dielectric substrate 33 so as to surround the antenna 34 is illustrated in FIGS. 3A and 3B, but the arrangement and number of light-emitting elements 36 are not limited to those illustrated in FIGS. 3A and 3B. In addition, the light-emitting elements 36 do not have to be LEDs. In FIG. 3B, in a side view, the length from the dielectric substrate 33 to the top surfaces of the patch antennas 35 is shorter than the length from the dielectric substrate 33 to the top surfaces of the light-emitting elements 36. In this configuration, paths along which the light rays emitted by the light-emitting elements, which function as light sources, travel are not obstructed.

Furthermore, as illustrated in FIG. 3B, in the lighting fixture 3, a plurality of communication ICs 37, an optical communication connector 38, and a light-emitting element driving IC 39 are provided on the rear surface of the dielectric substrate 33, that is, the surface of the dielectric substrate 33 on the opposite side from the surface on which the antenna 34 is provided. In addition, a power supply circuit, a power supply connector, and so forth, which are not illustrated, may be provided on the rear surface of the dielectric substrate 33.

The communication ICs 37 include a communication IC 37a that transmits and receives communication signals to and from the terminals 4 and a communication IC 37b that transmits and receives communication signals to and from the network server 2. The communication IC 37a and the communication IC 37b may be configured to each include a radio frequency integrated circuit (RFIC) that performs radio-frequency signal processing and a baseband integrated circuit (BBIC) that performs baseband signal processing.

The side of the surface of the dielectric substrate 33 on which the antenna 34 and the light-emitting elements 36 are provided is covered by the cover 31. The dielectric substrate 33 and the cover 31 are fixed to the base member 32, thus forming the lighting fixture 3. Examples of materials for the cover 31 are translucent resin and glass, but the material of the cover 31 is not limited to these materials. The cover 31 functions as a radome for the antenna 34, and therefore the cover 31 can be formed of a material having a low dielectric constant.

Figure 4A:
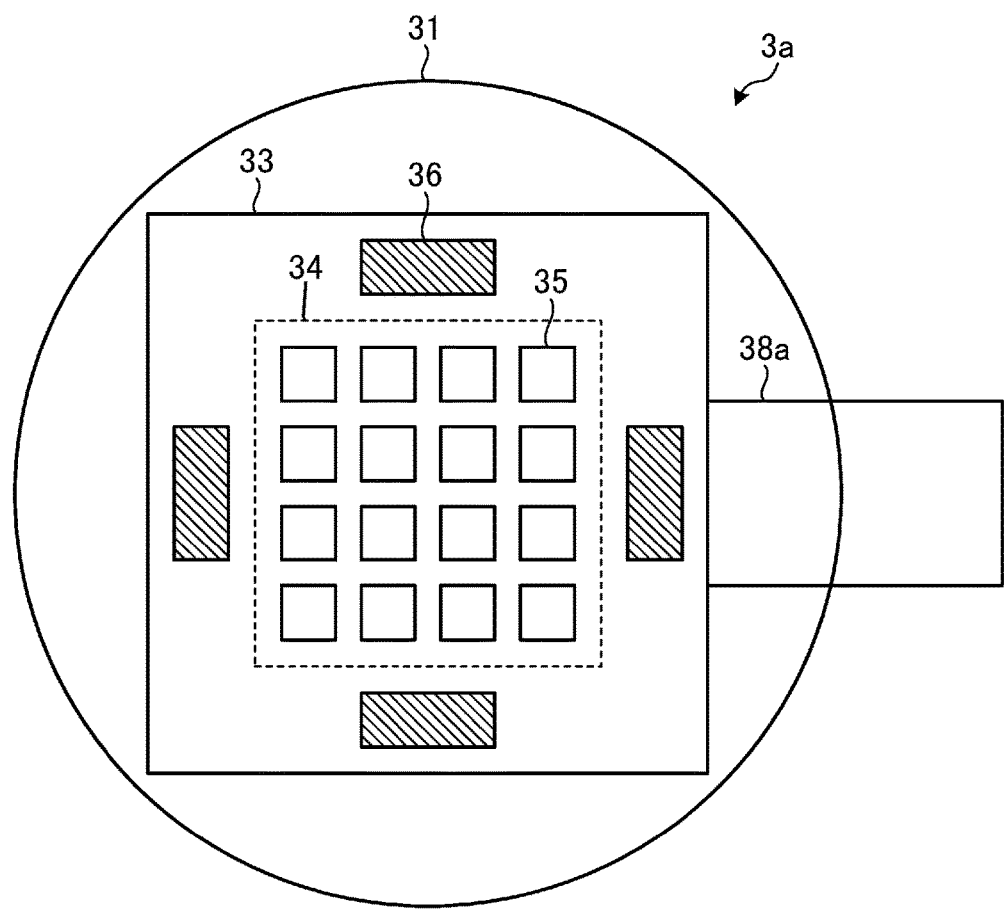
FIG. 4A is a diagram illustrating an example of a lighting fixture according to a first modification of Embodiment 1.
Figure 4B:
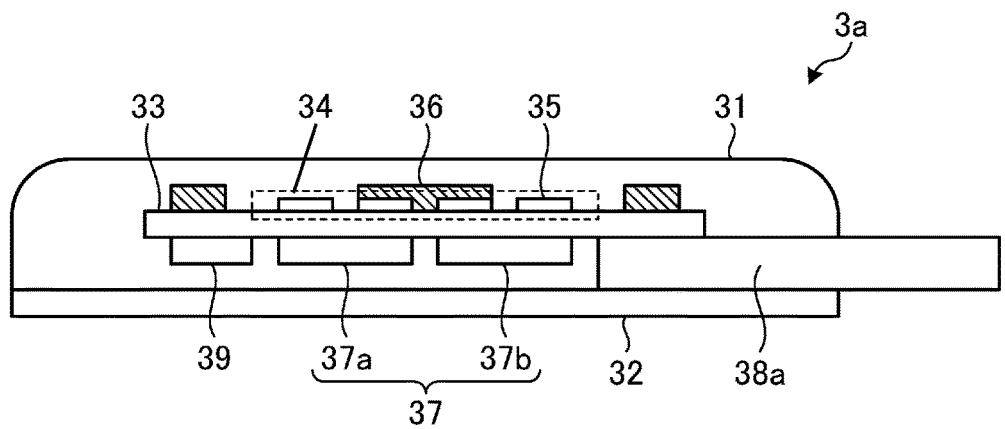
FIG. 4B is a diagram illustrating the example of the lighting fixture according to the first modification of Embodiment 1.
Figure 5A:
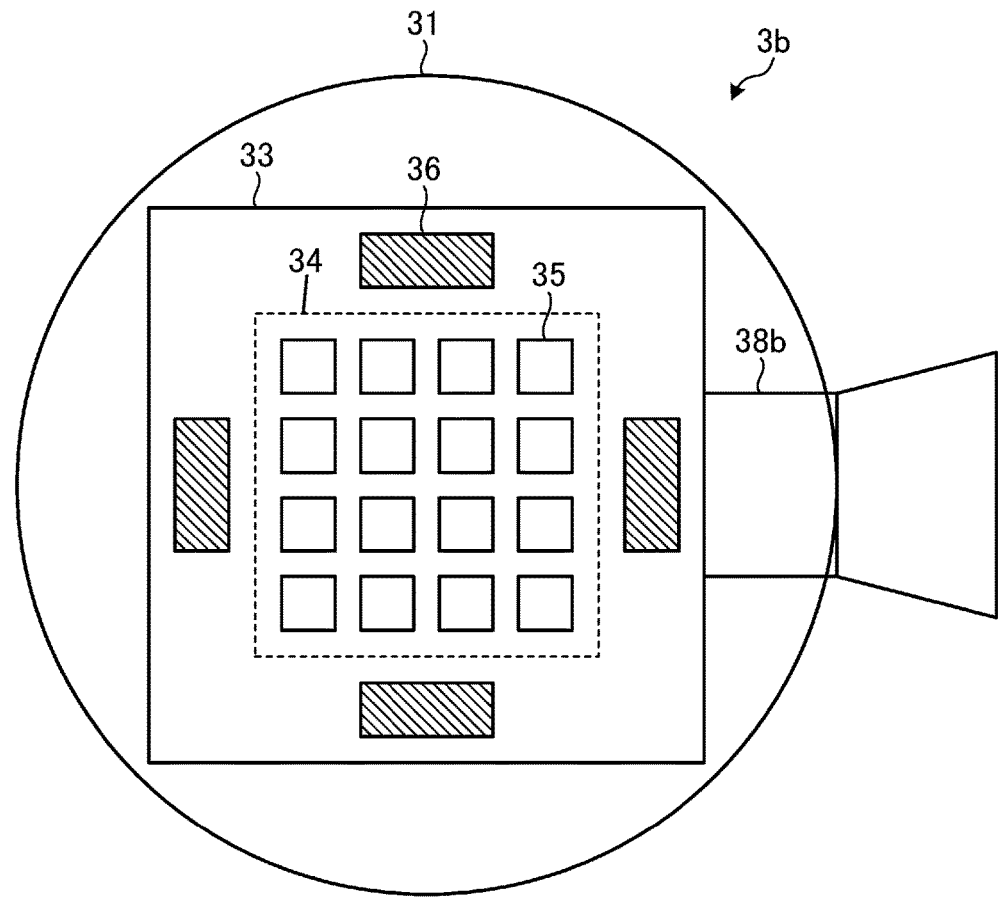
FIG. 5A is a diagram illustrating an example of a lighting fixture according to a second modification of Embodiment 1.
Figure 5B:
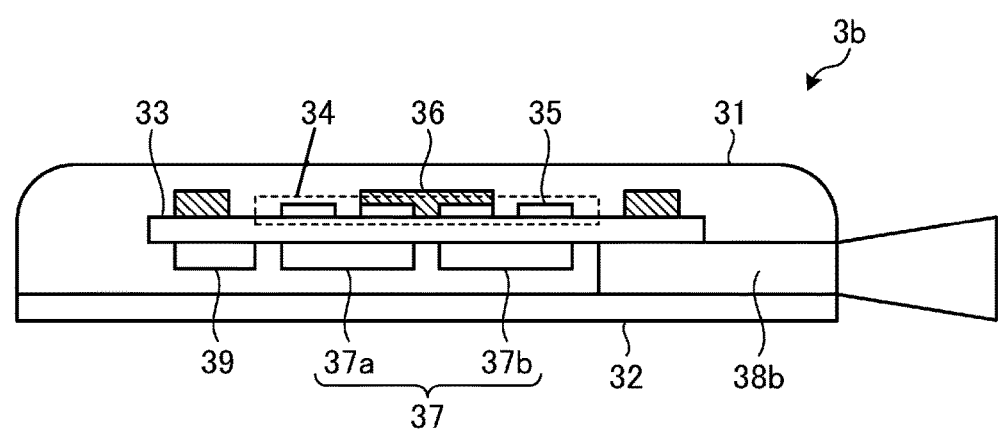
FIG. 5B is a diagram illustrating the example of the lighting fixture according to the second modification of Embodiment 1.

FIGS. 4A and 4B are diagrams illustrating an example of a lighting fixture according to a first modification of Embodiment 1. FIGS. 5A and 5B are diagrams illustrating an example of a lighting fixture according to a second modification of Embodiment 1. FIGS. 4A and 5A correspond to the top view illustrated in FIG. 2A. FIGS. 4B and 5B correspond to the side view illustrated in FIG. 2C.

In the configuration of a lighting fixture 3a illustrated in FIGS. 4A and 4B, a waveguide antenna 38a is provided instead of the optical communication connector 38 illustrated in FIGS. 3A and 3B. In the configuration of a lighting fixture 3b illustrated in FIGS. 5A and 5B, a horn antenna 38b is provided instead of the optical communication connector 38 illustrated in FIGS. 3A and 3B.

In the configuration illustrated in FIGS. 4A and 4B or FIGS. 5A and 5B, the lighting fixture 3a or 3b transmits and receives millimeter-wave-band communication signals to and from the network server 2. Millimeter-wave-band communication between the network server 2 and the lighting fixture 3a or 3b is performed in a different frequency band from millimeter-wave-band communication between the terminals 4 and the lighting fixture 3a or 3b.

Figure 6A:
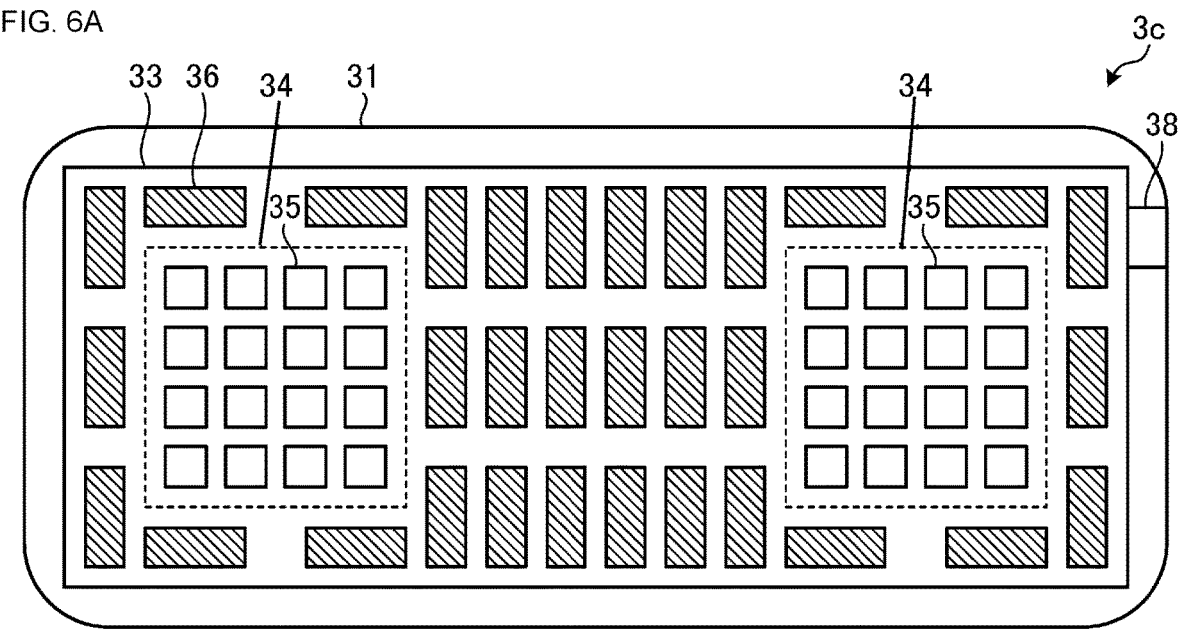
FIG. 6A is a diagram illustrating an example of a lighting fixture according to a third modification of Embodiment 1.
Figure 6B:
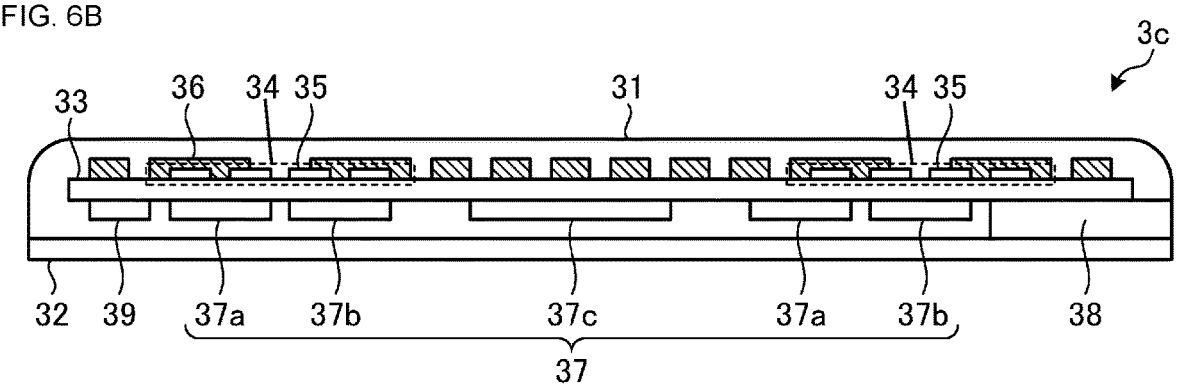
FIG. 6B is a diagram illustrating the example of the lighting fixture according to the third modification of Embodiment 1.

FIGS. 6A and 6B are diagrams illustrating an example of a lighting fixture according to a third modification of Embodiment 1. FIG. 6A corresponds to the top view illustrated in FIG. 2A. FIG. 6B corresponds to the side view illustrated in FIG. 2C.

In the configuration of a lighting fixture 3c illustrated in FIGS. 6A and 6B, two antennas 34 are provided on the dielectric substrate 33. The example illustrated in FIGS. 6A and 6B, a configuration is illustrated in which the single communication IC 37a and the single communication IC 37b are provided for each of the two antennas 34. Furthermore, in the example illustrated in FIGS. 6A and 6B, a control IC 37c is provided for performing communication control for the two antennas 34. The configurations of the communication ICs 37 are not limited to the above description.

Furthermore, as illustrated in FIG. 6B, in the lighting fixture 3c, a plurality of communication ICs 37, the optical communication connector 38, and the light-emitting element driving IC 39 are provided on the rear surface of the dielectric substrate 33, that is, the surface of the dielectric substrate 33 on the opposite side from the surface on which the antennas 34 are provided. In addition, a power supply circuit, a power supply connector, and so forth, which are not illustrated, may be provided on the rear surface of the dielectric substrate 33.

Figure 7:
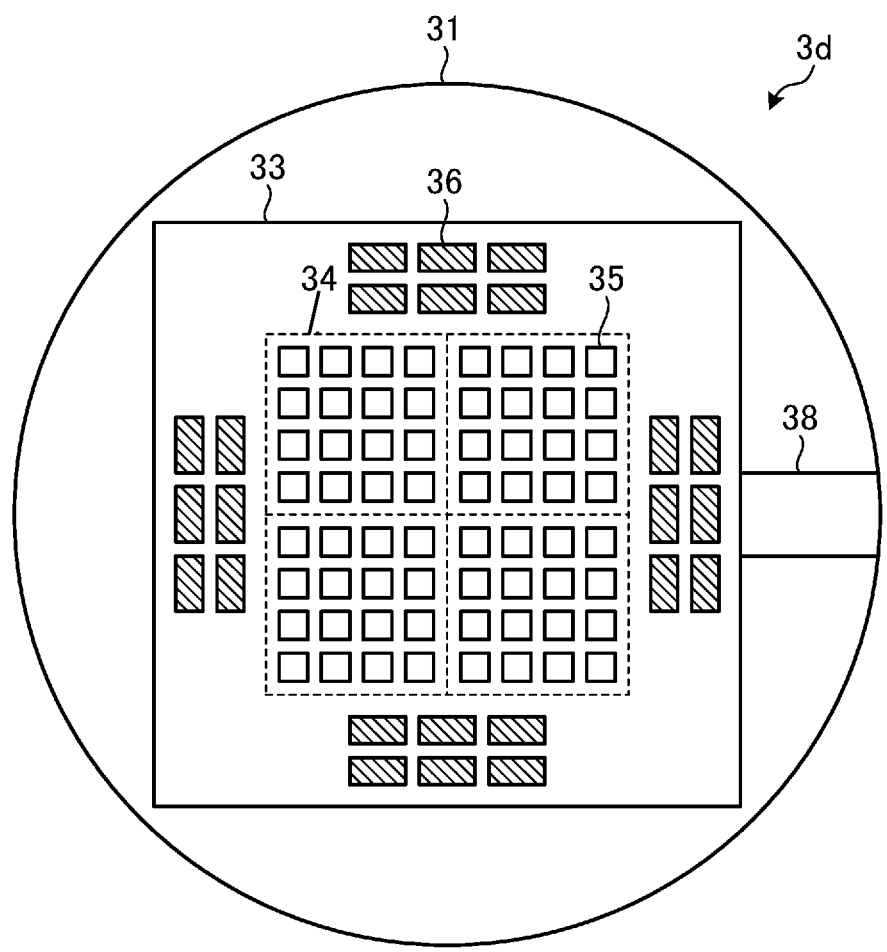
FIG. 7 is a diagram illustrating an example of a lighting fixture according to a fourth modification of Embodiment 1.

FIG. 7 is a diagram illustrating an example of a lighting fixture according to a fourth modification of Embodiment 1. FIG. 7 corresponds to the top view illustrated in FIG. 2A.

In the configuration of a lighting fixture 3d illustrated in FIG. 7, four antennas 34 are provided on the dielectric substrate 33. This configuration can support Massive MIMO.

The number of antennas 34 is not limited to two as illustrated in FIGS. 6A and 6B or four as illustrated in FIG. 7 and may be any plurality number, such as three or five or more.

Figure 8:
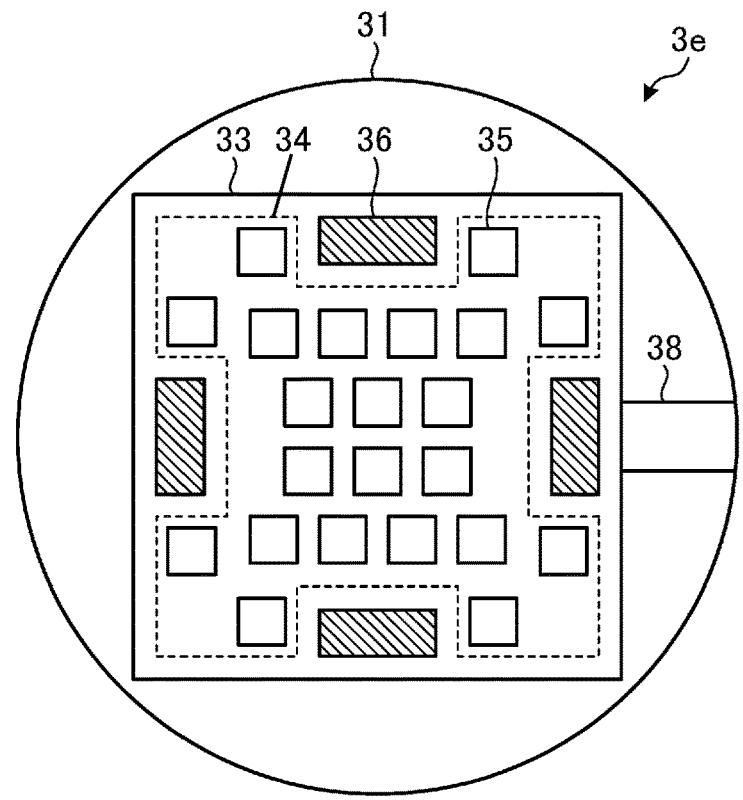
FIG. 8 is a diagram illustrating an example of a lighting fixture according to a fifth modification of Embodiment 1.

FIG. 8 is a diagram illustrating an example of a lighting fixture according to a fifth modification of Embodiment 1. FIG. 8 corresponds to the top view illustrated in FIG. 2A.

An example is illustrated in FIGS. 3A and 3B in which the numbers of rows and columns of the patch antennas 35 are 4×4, but the patch antennas 35 do not necessarily have to be arrayed side by side in two directions as in the case of a lighting fixture 3e illustrated in FIG. 8. In the lighting fixture 3e configured as in FIG. 8, distances can be ensured between the plurality of patch antennas 35, and therefore antenna gain and directivity can be improved. In addition, since distances can be ensured between the plurality of patch antennas 35, spatial diversity can also be implemented. For example, a distance of at least $\lambda/2$ can be ensured between a patch antenna 35 that is close to a light-emitting element 36 and a patch antenna 35 that is close to another light-emitting element 36, and therefore spatial diversity can be implemented.

Figure 9:
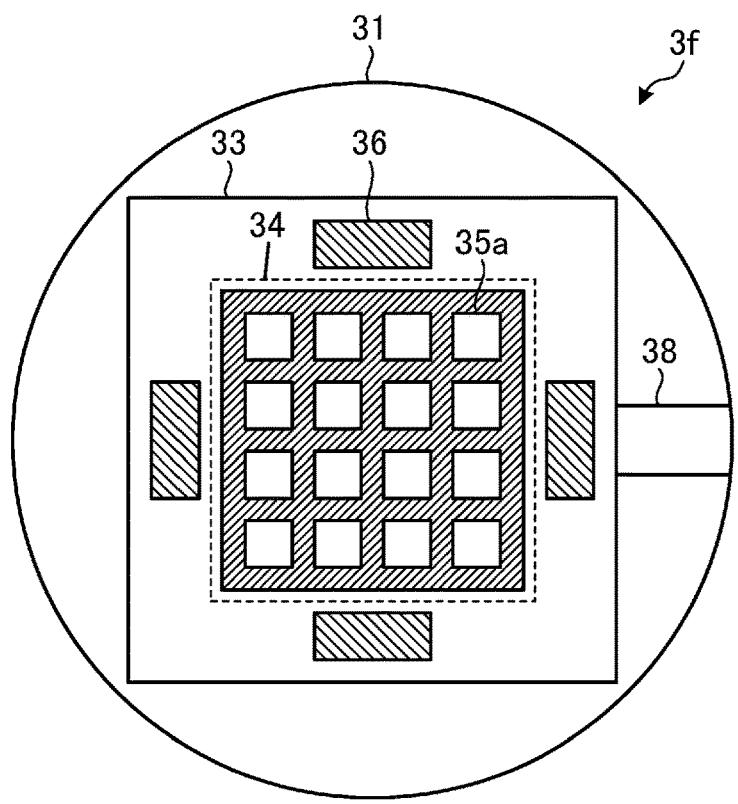
FIG. 9 is a diagram illustrating an example of a lighting fixture according to a sixth modification of Embodiment 1.

FIG. 9 is a diagram illustrating an example of a lighting fixture according to a sixth modification of Embodiment 1. FIG. 9 corresponds to the top view illustrated in FIG. 2A.

Although an example is illustrated in FIGS. 3A and 3B in which the antenna 34 is an array antenna in which a plurality of patch antennas 35 are disposed on the surface of the dielectric substrate 33, the antenna 34 may instead be an array antenna in which slits 35a are arrayed in a conductor provided on the surface of the dielectric substrate 33 as in a lighting fixture 3f illustrated in FIG. 9.

Figure 10:
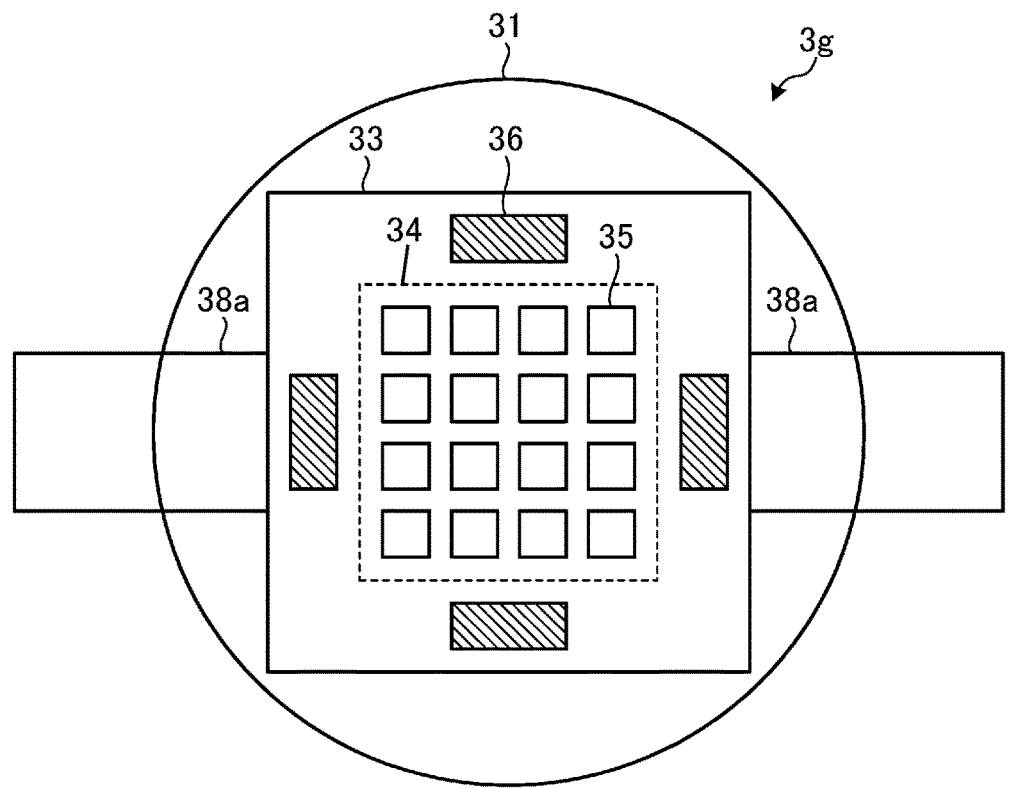
FIG. 10 is a diagram illustrating an example of a lighting fixture according to a seventh modification of Embodiment 1.
Figure 11:
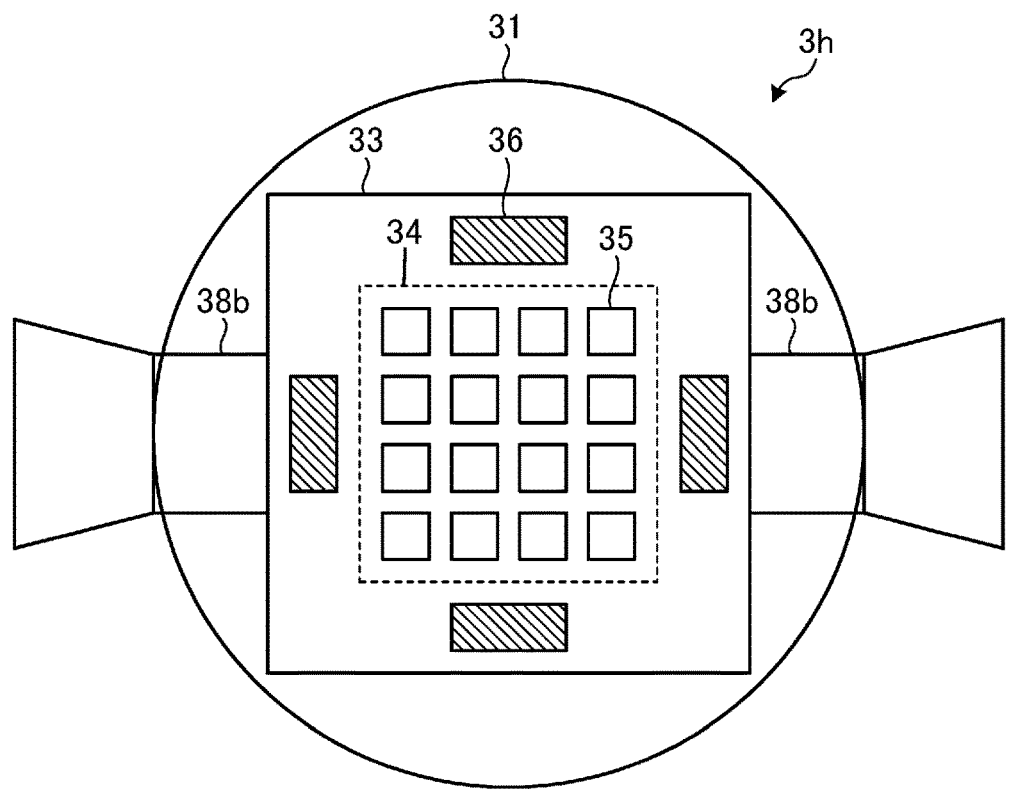
FIG. 11 is a diagram illustrating an example of a lighting fixture according to an eighth modification of Embodiment 1.

FIG. 10 is a diagram illustrating an example of a lighting fixture according to a seventh modification of Embodiment 1. FIG. 11 is a diagram illustrating an example of a lighting fixture according to an eighth modification of Embodiment 1. FIGS. 10 and 11 correspond to the top view illustrated in FIG. 2A.

A lighting fixture 3g illustrated in FIG. 10 and a lighting fixture 3h illustrated in FIG. 11 have a repeater function for relaying millimeter-wave-band communication to and from the network server 2.

In the lighting fixture 3g illustrated in FIG. 10, two waveguide antennas 38a are provided. In the configuration illustrated in FIG. 10, a repeater function can be implemented by using one waveguide antenna 38a for reception and the other waveguide antenna 38a for transmission.

In the lighting fixture 3h illustrated in FIG. 11, two horn antennas 38b are provided. In the configuration illustrated in FIG. 11, a repeater function can be implemented by using one horn antenna 38b for reception and the other horn antenna 38b for transmission.

A high-speed and large-capacity information distribution service can be provided to a large number of terminals 4 inside the closed space 100 while suppressing the risk of propagation to outside the closed space 100 by applying the lighting fixture 3, 3a, 3b, 3c, 3d, 3e, 3f, 3g, or 3h of Embodiment 1 described above to the communication network system 1 in the closed space 100 illustrated in FIGS. 2A, 2B, and 2C.

Embodiment 2

Figure 12A:
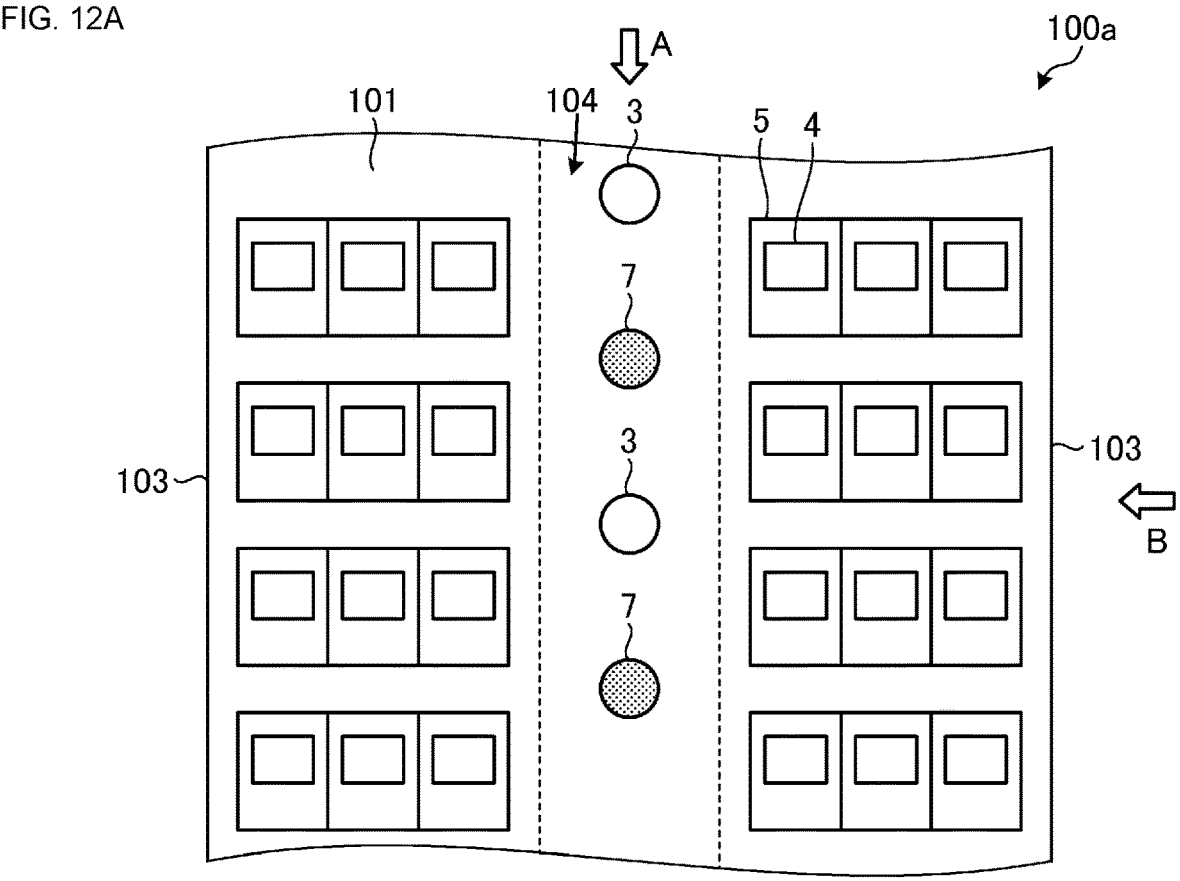
FIG. 12A is a diagram illustrating an example layout in a closed space of a communication network system according to Embodiment 2.
Figure 12B:
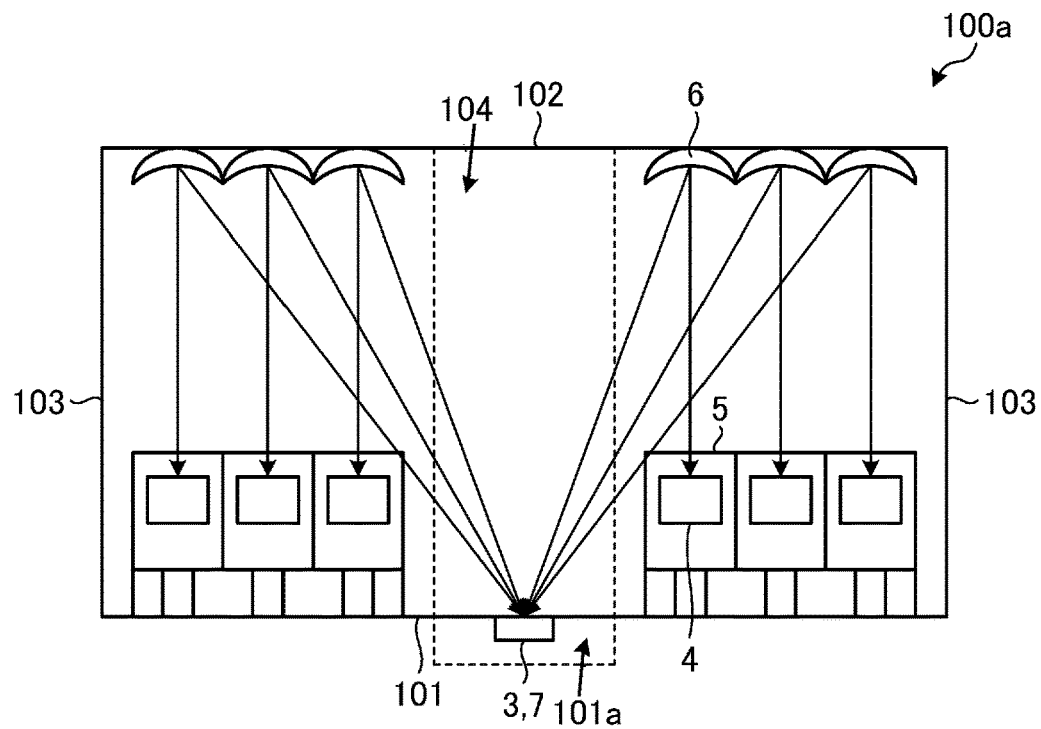
FIG. 12B is a diagram illustrating the example layout in the closed space of the communication network system according to Embodiment 2.
Figure 12C:
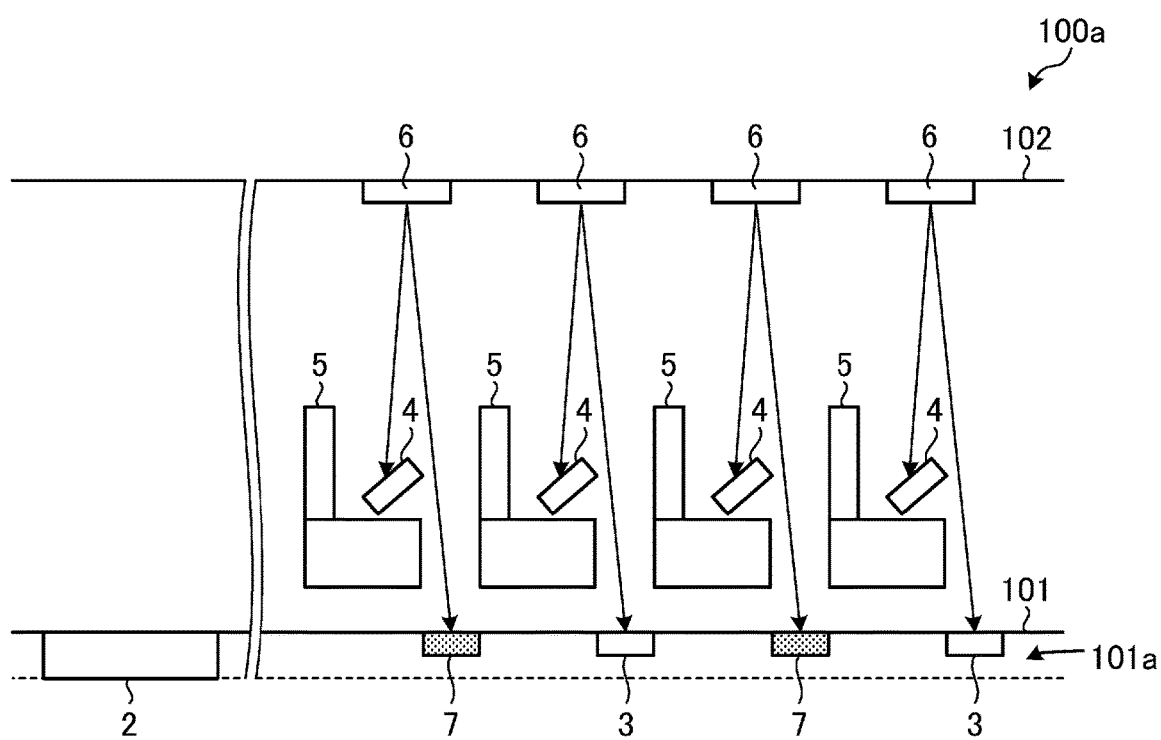
FIG. 12C is a diagram illustrating the example layout in the closed space of the communication network system according to Embodiment 2.

FIGS. 12A, 12B, and 12C are diagrams illustrating an example layout in the closed space of a communication network system according to Embodiment 2. The basic configuration of the communication network system and the configuration of the lighting fixtures are the same as in Embodiment 1, and therefore description thereof is omitted. Note that, in this embodiment, the lighting fixtures 3, 3a, 3b, 3c, 3d, 3e, 3f, 3g, and 3h described in Embodiment 1 are simply referred to as "lighting fixtures 3".

In the example illustrated in FIGS. 12A, 12B, and 12C, in addition to the lighting fixtures 3 described in Embodiment 1, the system includes repeaters 7 having a base station function.

Similarly to the lighting fixtures 3, the repeaters 7 are embedded in a space 101a provided in the floor 101 of the aisle 104 of the cabin 100a and transmit and receive communication signals to and from the network server 2 provided in the space 101a. The network server 2 and the repeaters 7 transmit and receive, for example, 40 Gbps optical communication or millimeter-wave-band communication signals, similarly to the lighting fixtures 3.

Figure 13A:
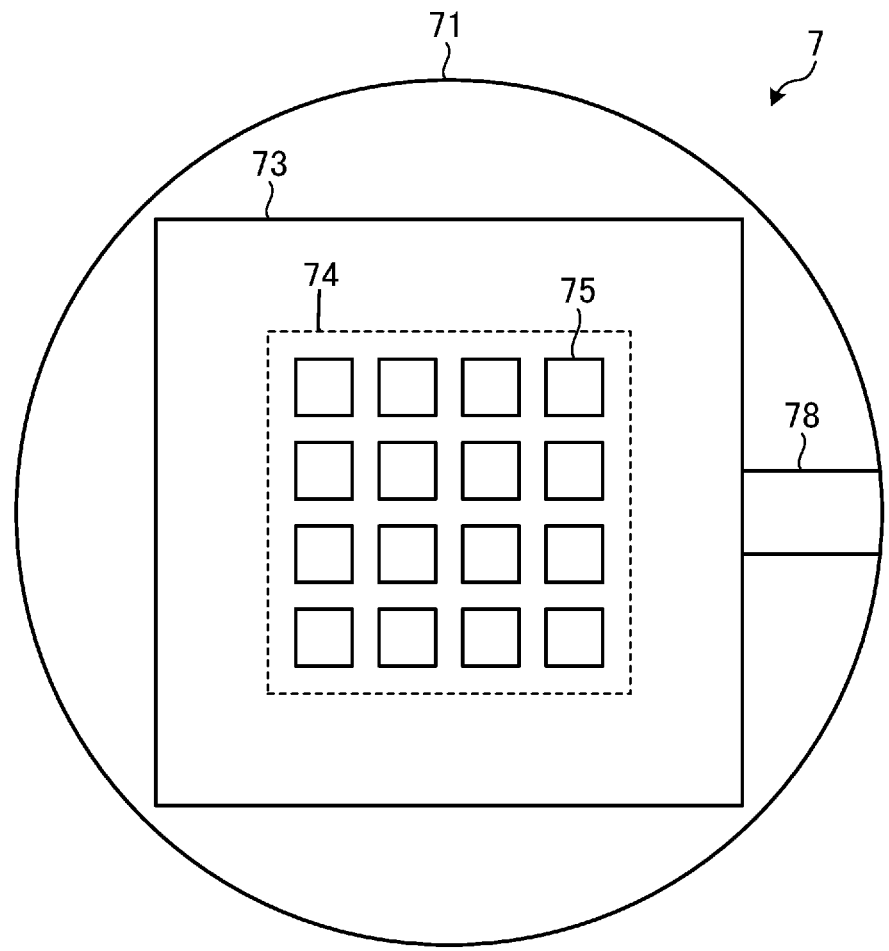
FIG. 13A is a diagram illustrating an example of a repeater according to Embodiment 2.
Figure 13B:
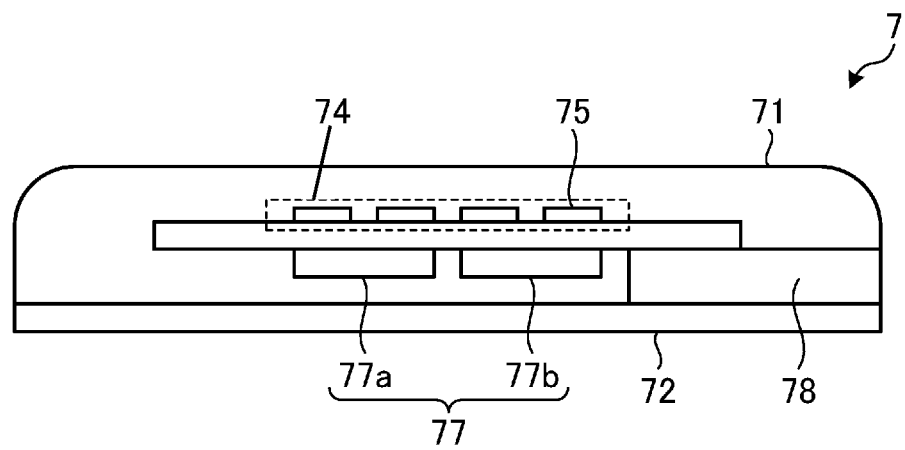
FIG. 13B is a diagram illustrating the example of the repeater according to Embodiment 2.

FIGS. 13A and 13B are diagrams illustrating an example of a repeater according to Embodiment 2. FIG. 13A corresponds to the top view illustrated in FIG. 12A. FIG. 13B corresponds to the side view illustrated in FIG. 12C. In the configuration illustrated in FIGS. 13A and 13B, the repeater 7 transmits and receives optical communication signals to and from the network server 2.

The repeater 7 includes a cover 71, an antenna 74 that is provided so that a radiating surface thereof faces the cover 71 and that transmits and receives millimeter-wave-band communication signals to and from the terminals 4, and a base member 72 to which the cover 71 is fixed.

Specifically, as illustrated in FIGS. 13A and 13B, in the repeater 7, the antenna 74, which transmits and receives millimeter-wave-band communication signals to and from the terminals 4, is provided on a dielectric substrate 73.

The antenna 74 is an array antenna in which a plurality of patch antennas 75 are arrayed on the surface of the dielectric substrate 73. The patch antennas 75 are radiating conductors provided on the surface of the dielectric substrate 73. In the antenna 74, for example, the plurality of patch antennas 75 provided on the dielectric substrate 73 are arrayed in a matrix pattern. Radio waves are radiated from the surface (radiating surface) of the dielectric substrate 73 on which the antenna 74 is provided. Although an example is illustrated in FIGS. 13A and 13B in which the numbers of rows and columns of the patch antennas 75 are 4×4, the numbers of rows and columns of patch antennas 75 are not limited to this example.

Furthermore, as illustrated in FIG. 13B, in the repeater 7, a plurality of communication ICs 77 and an optical communication connector 78 are provided on the rear surface of the dielectric substrate 73, that is, the surface of the dielectric substrate 73 on the opposite side from the surface on which the antenna 74 is provided. In addition, similarly to the lighting fixture 3, a power supply circuit, a power supply connector, and so forth, which are not illustrated, may be provided on the rear surface of the dielectric substrate 73.

The communication ICs 77 include a communication IC 77a that transmits and receives communication signals to and from the terminals 4 and a communication IC 77b that transmits and receives communication signals to and from the network server 2. The communication IC 77a and the communication IC 77b may be configured to each include a radio frequency integrated circuit (RFIC) that performs radio-frequency signal processing and a baseband integrated circuit (BBIC) that performs baseband signal processing.

The side of the surface of the dielectric substrate 73 on which the antenna 74 is provided is covered by the cover 71. The dielectric substrate 73 and the cover 71 are fixed to the base member 72, thus forming the repeater 7. Unlike the material of the cover 31 of the lighting fixture 3, the material of the cover 71 does not necessarily have to be translucent, but has to be a material that allows millimeter-wave-band communication to pass therethrough to and from the terminals 4. The material of the cover 71 can be a material having a low dielectric constant so as to not affect the directivity of the antenna 74.

Figure 14A:
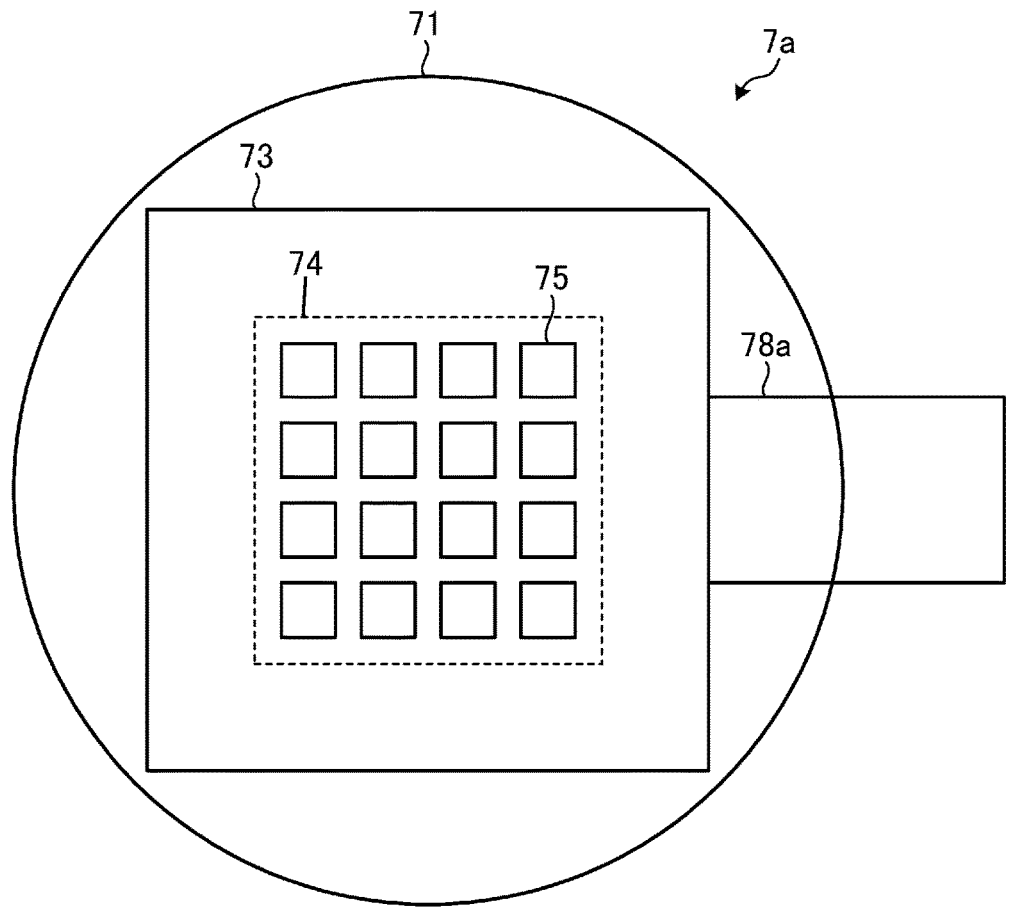
FIG. 14A is a diagram illustrating an example of a repeater according to a first modification of Embodiment 2.
Figure 14B:
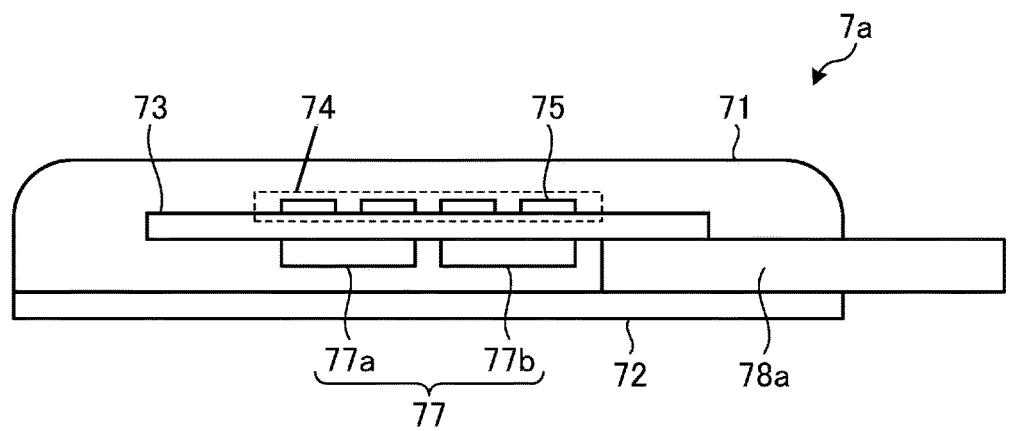
FIG. 14B is a diagram illustrating the example of the repeater according to the first modification of Embodiment 2.
Figure 15A:
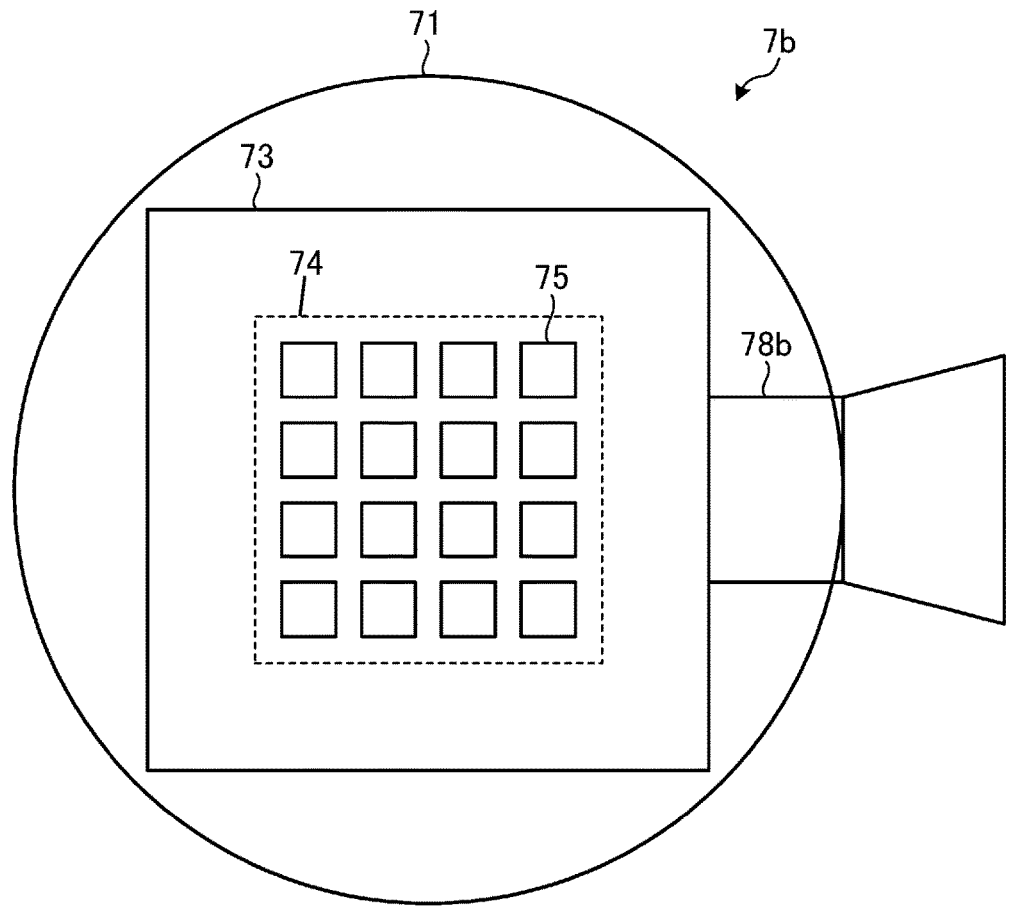
FIG. 15A is a diagram illustrating an example of a repeater according to a second modification of Embodiment 2.
Figure 15B:
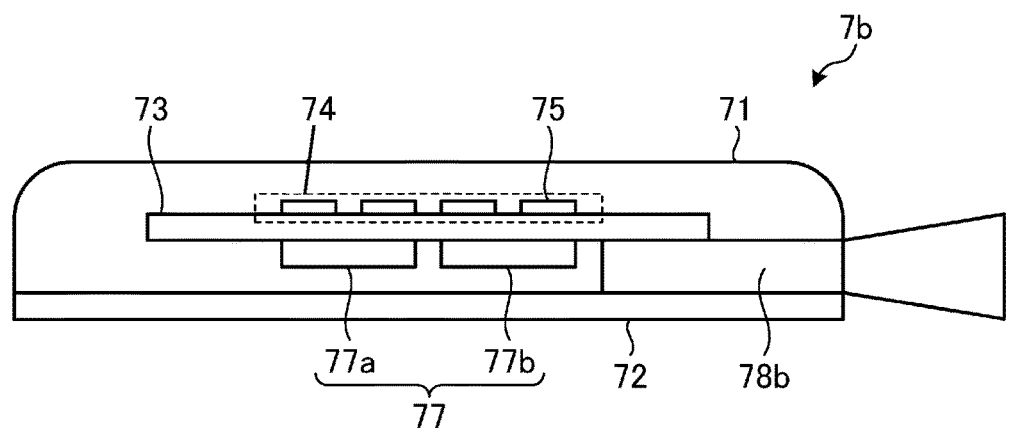
FIG. 15B is a diagram illustrating the example of the repeater according to the second modification of Embodiment 2.

FIGS. 14A and 14B are diagrams illustrating an example of a repeater according to a first modification of Embodiment 2. FIGS. 15A and 15B are diagrams illustrating an example of a repeater according to a second modification of Embodiment 2. FIGS. 14A and 15A correspond to the top view illustrated in FIG. 13A. FIGS. 14B and 15B correspond to the side view illustrated in FIG. 13B.

In the configuration of a repeater 7a illustrated in FIGS. 14A and 14B, a waveguide antenna 78a is provided instead of the optical communication connector 78 illustrated in FIGS. 13A and 13B. In the configuration of a repeater 7b illustrated in FIGS. 15A and 15B, a horn antenna 78b is provided instead of the optical communication connector 78 illustrated in FIGS. 13A and 13B.

In the configuration illustrated in FIGS. 14A and 14B or FIGS. 15A and 15B, the repeater 7a or 7b transmits and receives millimeter-wave-band communication signals to and from the network server 2. Millimeter-wave-band communication between the network server 2 and the repeaters 7a and 7b is performed in a different frequency band from millimeter-wave-band communication between the terminals 4 and the repeaters 7a and 7b.

Figure 16:
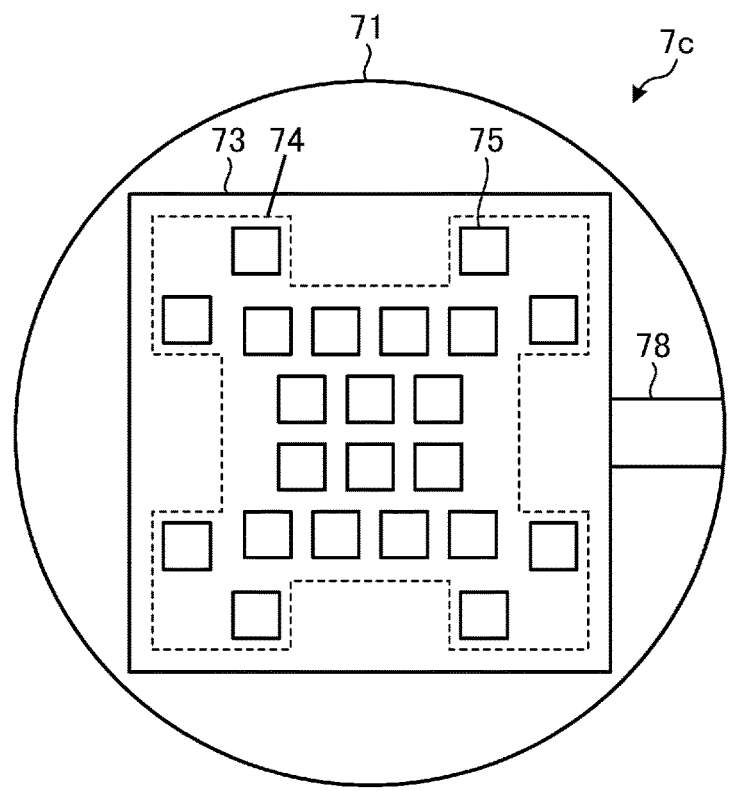
FIG. 16 is a diagram illustrating an example of a repeater according to a third modification of Embodiment 2.

FIG. 16 is a diagram illustrating an example of a repeater according to a third modification of Embodiment 2. FIG. 16 corresponds to the top view illustrated in FIG. 13A.

An example is illustrated in FIGS. 13A and 13B in which the numbers of rows and columns of the patch antennas 35 are 4×4, but, similarly to as in the lighting fixture 3e according to the fifth modification of Embodiment 1, the patch antennas 75 do not necessarily have to be arrayed side by side in two directions as in the case of a repeater 7c illustrated in FIG. 16.

Figure 17:
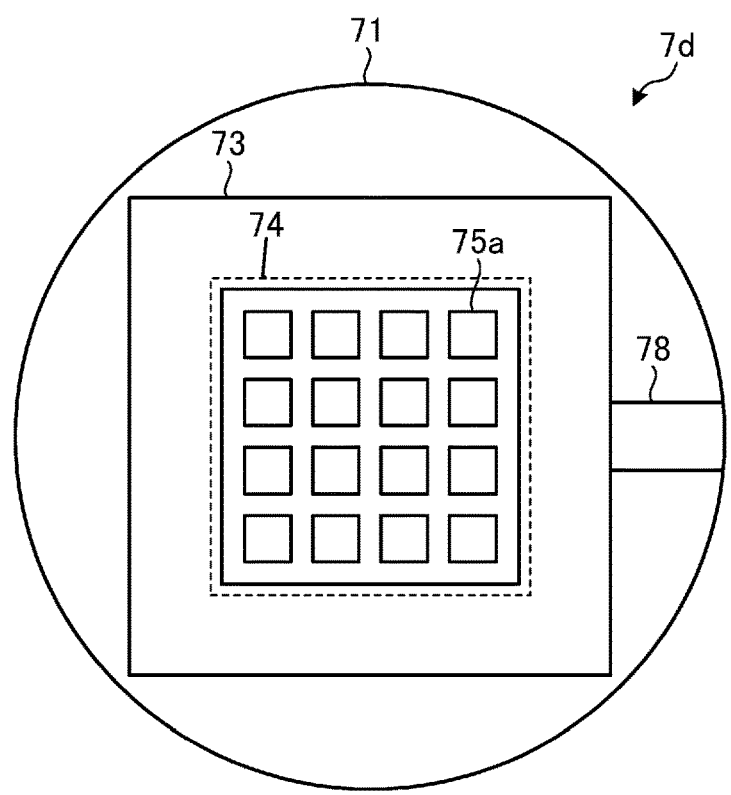
FIG. 17 is a diagram illustrating an example of a repeater according to a fourth modification of Embodiment 2.

FIG. 17 is a diagram illustrating an example of a repeater according to a fourth modification of Embodiment 2. FIG. 17 corresponds to the top view illustrated in FIG. 13A.

An example is illustrated in FIGS. 13A and 13B in which the antenna 74 is an array antenna in which a plurality of patch antennas 75 are arrayed on the surface of the dielectric substrate 73, but, similarly to as in the lighting fixture 3f according to the sixth modification of Embodiment 1, the antenna 74 may be an array antenna in which slits 75a are arrayed in a conductor provided on the surface of the dielectric substrate 73 as in a repeater 7d illustrated in FIG. 17.

Figure 18:
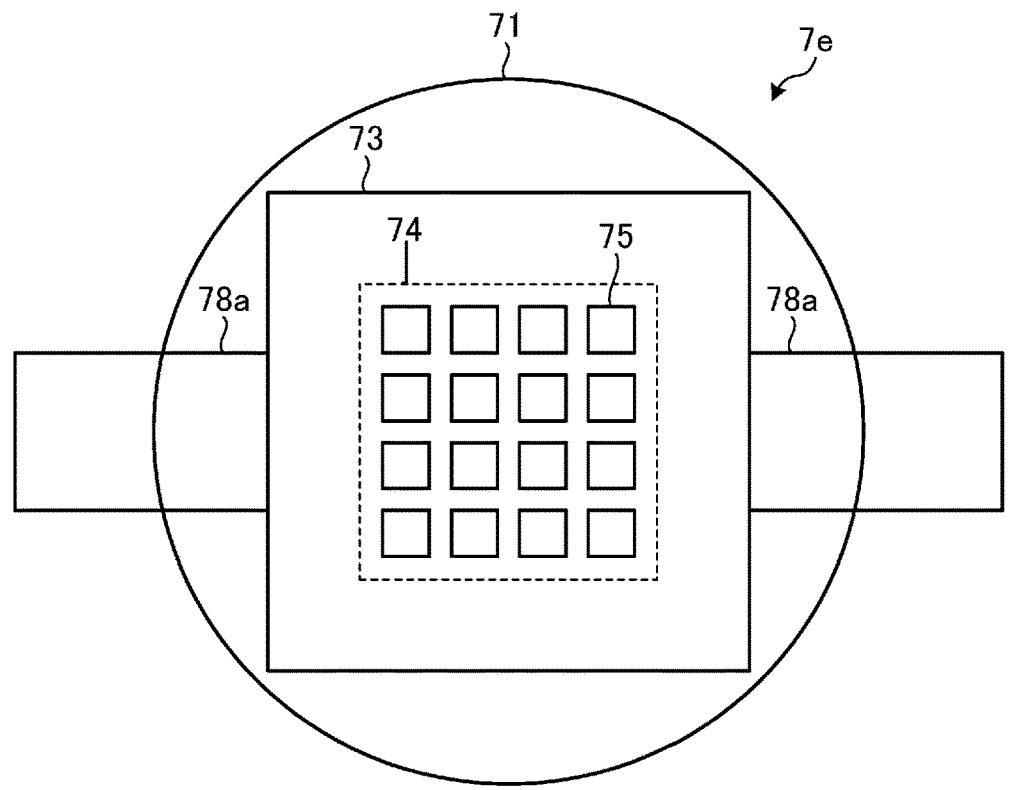
FIG. 18 is a diagram illustrating an example of a repeater according to a fifth modification of Embodiment 2.
Figure 19:
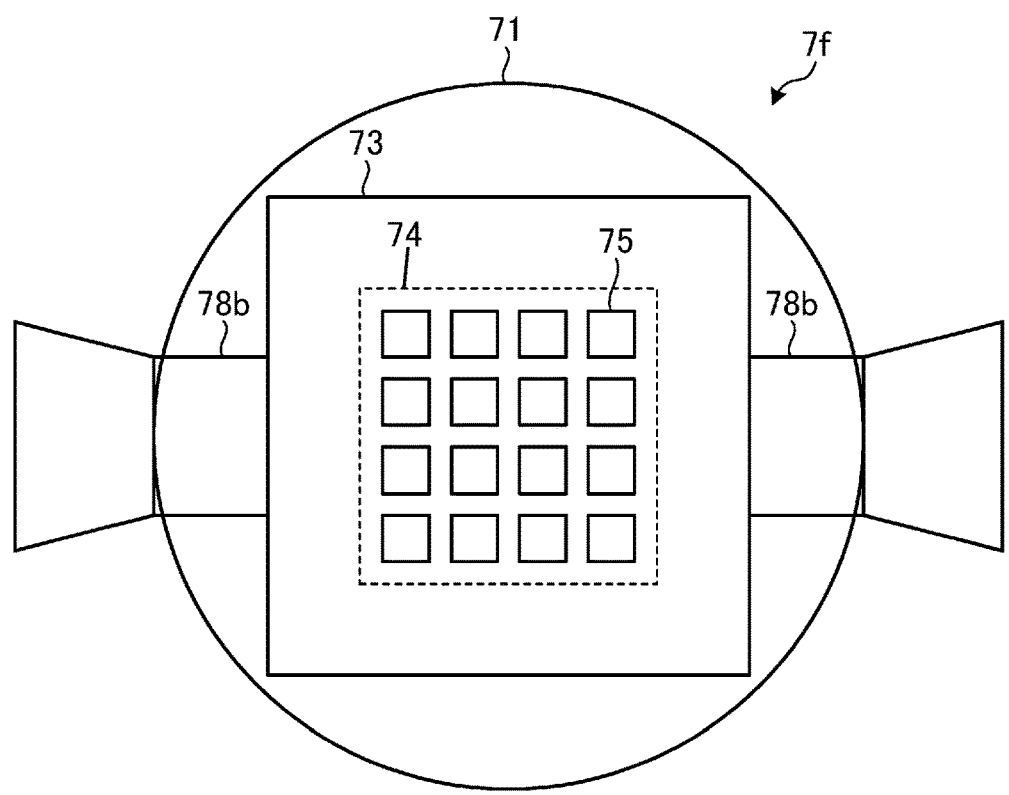
FIG. 19 is a diagram illustrating an example of a repeater according to a sixth modification of Embodiment 2.

FIG. 18 is a diagram illustrating an example of a repeater according to a fifth modification of Embodiment 2. FIG. 19 is a diagram illustrating an example of a repeater according to a sixth modification of Embodiment 2. FIGS. 18 and 19 correspond to the top view illustrated in FIG. 13A.

A repeater 7e illustrated in FIG. 18 and a repeater 7f illustrated in FIG. 19 have a repeater function for relaying millimeter-wave-band communication to and from the network server 2.

In the repeater 7e illustrated in FIG. 18, two waveguide antenna 78a are provided. In the configuration illustrated in FIG. 18, a repeater function can be implemented by using one waveguide antenna 78a for reception and the other waveguide antenna 78a for transmission.

In the repeater 7f illustrated in FIG. 19, two horn antennas 78b are provided. In the configuration illustrated in FIG. 19, a repeater function can be implemented by using one horn antenna 78b for reception and the other horn antenna 78b for transmission.

Similarly to the lighting fixture 3, a repeater according to this embodiment may have configuration in which two antennas 74 are provided on the dielectric substrate 73 (refer to FIGS. 6A and 6B) or may have a configuration in which four antennas 74 are provided on the dielectric substrate 73 (refer to FIG. 7). Furthermore, the number of antennas 74 is not limited to two or four and may be any plurality number, such as three or five or more.

A high-speed and large-capacity information distribution service can be provided to a large number of terminals 4 inside the closed space 100a while suppressing the risk of propagation to outside the closed space 100a by applying the repeater 7, 7a, 7b, 7c, 7d, 7e, or 7f of Embodiment 2 described above to the communication network system 1 in the closed space 100a illustrated in FIGS. 12A, 12B, and 12C.

Embodiment 3

Figure 20A:
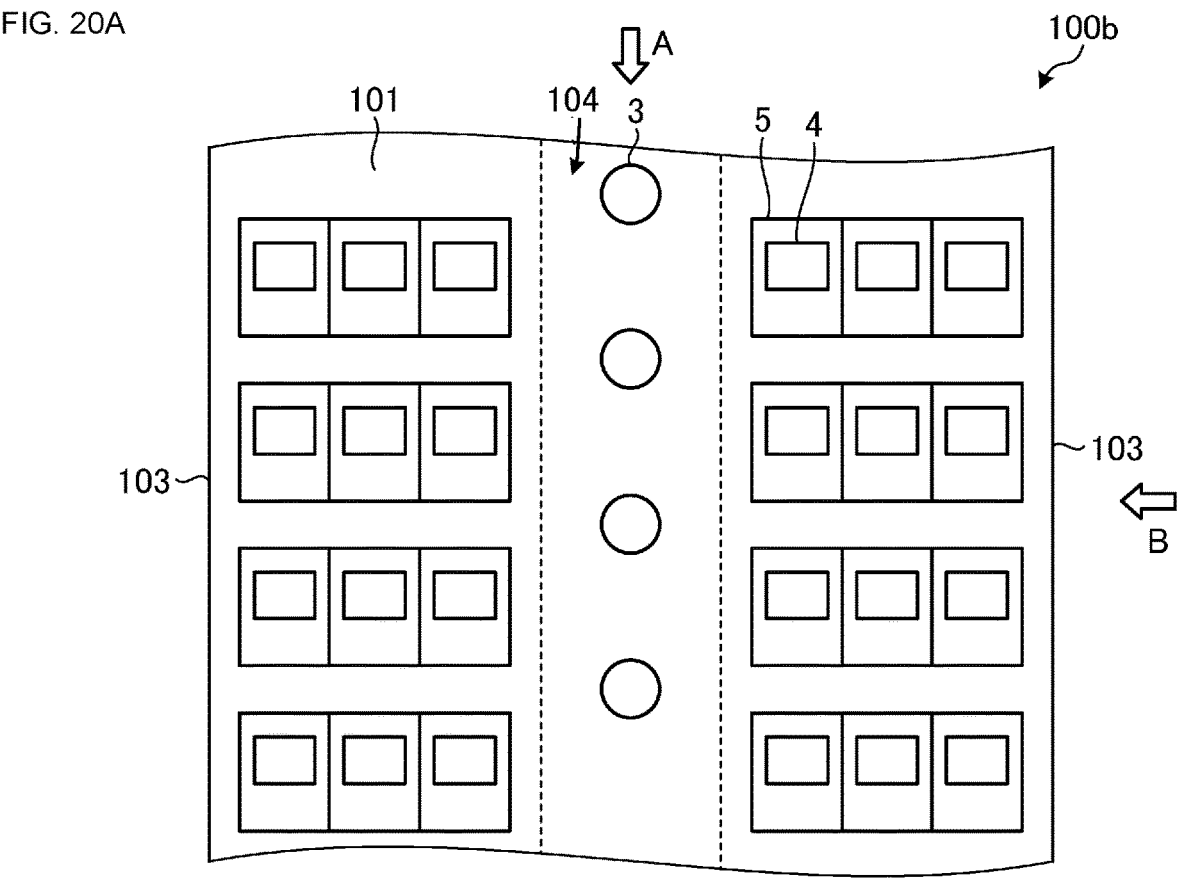
FIG. 20A is a diagram illustrating an example layout in a closed space of a communication network system according to Embodiment 3.
Figure 20B:
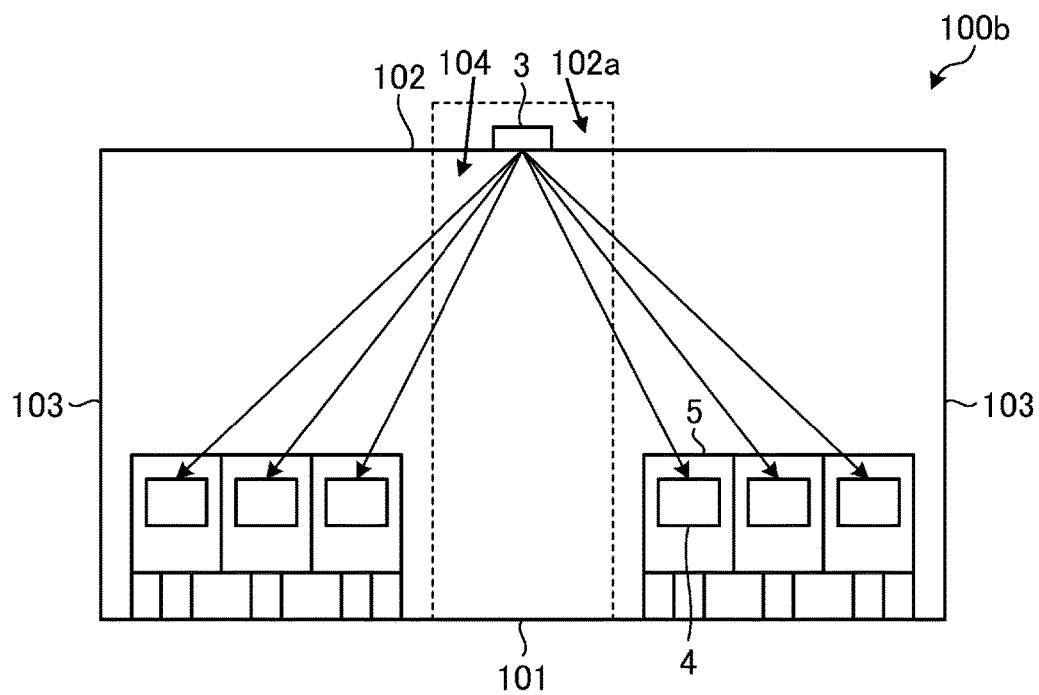
FIG. 20B is a diagram illustrating the example layout in the closed space of the communication network system according to Embodiment 3.
Figure 20C:
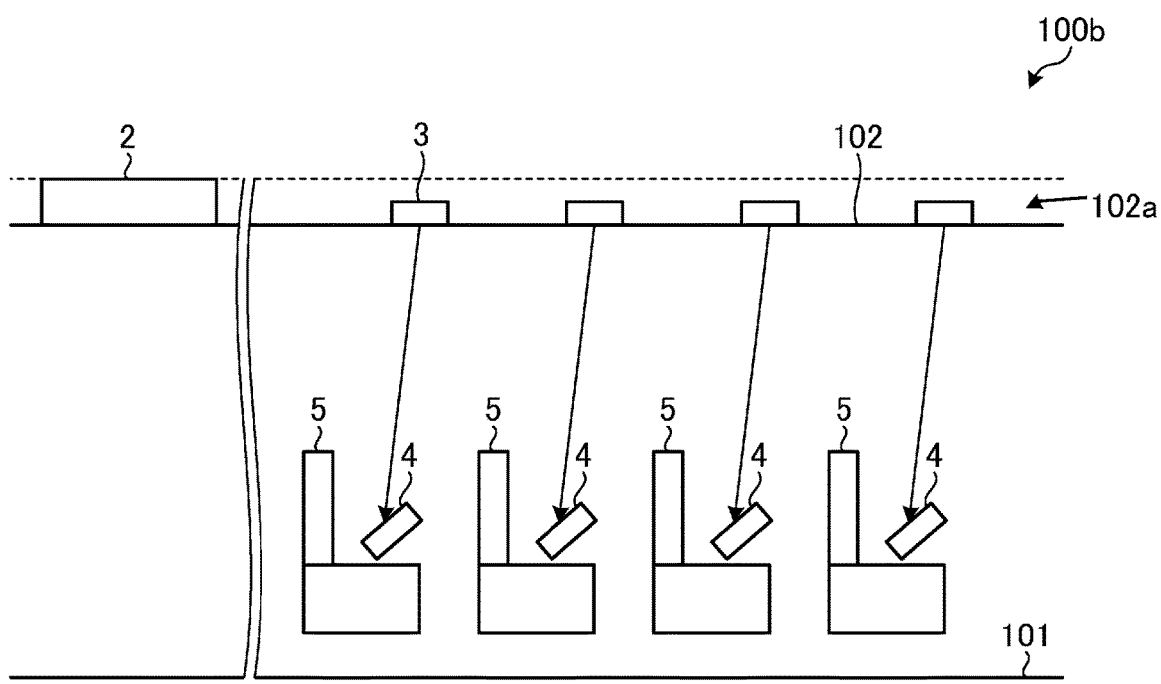
FIG. 20C is a diagram illustrating the example layout in the closed space of the communication network system according to Embodiment 3.

FIGS. 20A, 20B, and 20C are diagrams illustrating an example layout in the closed space of a communication network system according to Embodiment 3. The basic configuration of the communication network system and the configuration of the lighting fixtures are the same as in Embodiment 1, and therefore description thereof is omitted. Note that, in this embodiment as well, the lighting fixtures 3, 3a, 3b, 3c, 3d, 3e, 3f, 3g, and 3h described in Embodiment 1 are simply referred to as "lighting fixtures 3". In addition, in this embodiment, the repeaters 7, 7a, 7b, 7c, 7d, 7e, and 7f described in Embodiment 2 are simply referred to as "repeaters 7".

In this embodiment, as illustrated in FIGS. 20A, 20B, and 20C, a plurality of lighting fixtures 3 are embedded in a space 102a provided in a ceiling 102 of the aisle 104 of a cabin 100b. In the mode illustrated in FIGS. 20A, 20B, and 20C, the lighting fixtures 3 are, for example, exemplified by cabin lights providing, for example, ambient lighting that illuminates the entire cabin 100b.

In the example illustrated in FIGS. 20A, 20B, and 20C, the lighting fixtures 3 are provided so as to each correspond to a plurality of seats 5 arrayed in the lateral direction illustrated in FIG. 20A. Beam-formed radio waves radiated from the lighting fixtures 3 reach the terminals 4 of the individual seats 5.

Similarly to as in Embodiment 1, a reflector composed of a dielectric or an array of structures that are very small relative to the wavelength of the radio waves radiated from the lighting fixture 3 or the repeater 7 may be provided on the ceiling 102 above each seat 5. This enables radio waves diffusely reflected by the floor 101 and the walls 103 of the cabin 100b to efficiently reach the terminals 4 of the individual seats 5.

In addition, similarly to Embodiment 2, a configuration may be adopted that includes repeaters 7 having a base station function.

Embodiment 4

Figure 21A:
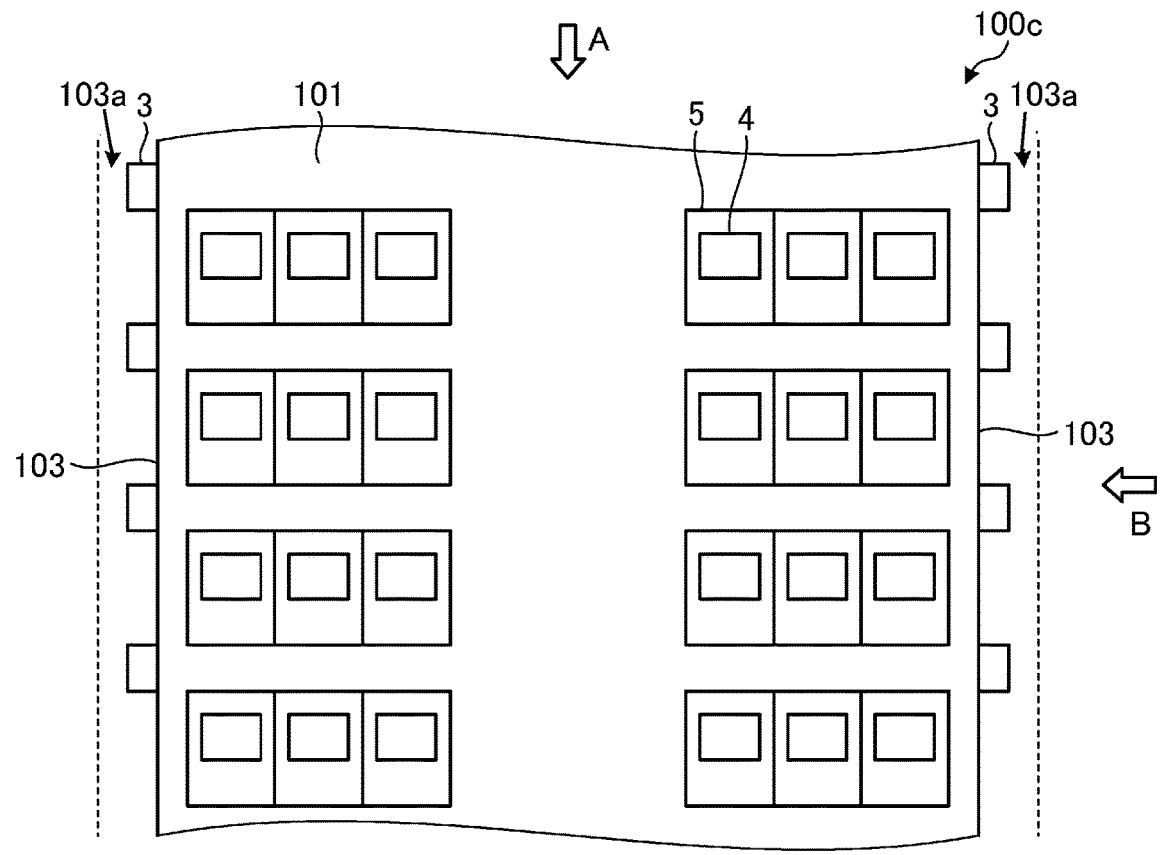
FIG. 21A is a diagram illustrating an example layout in a closed space of a communication network system according to Embodiment 4.
Figure 21B:
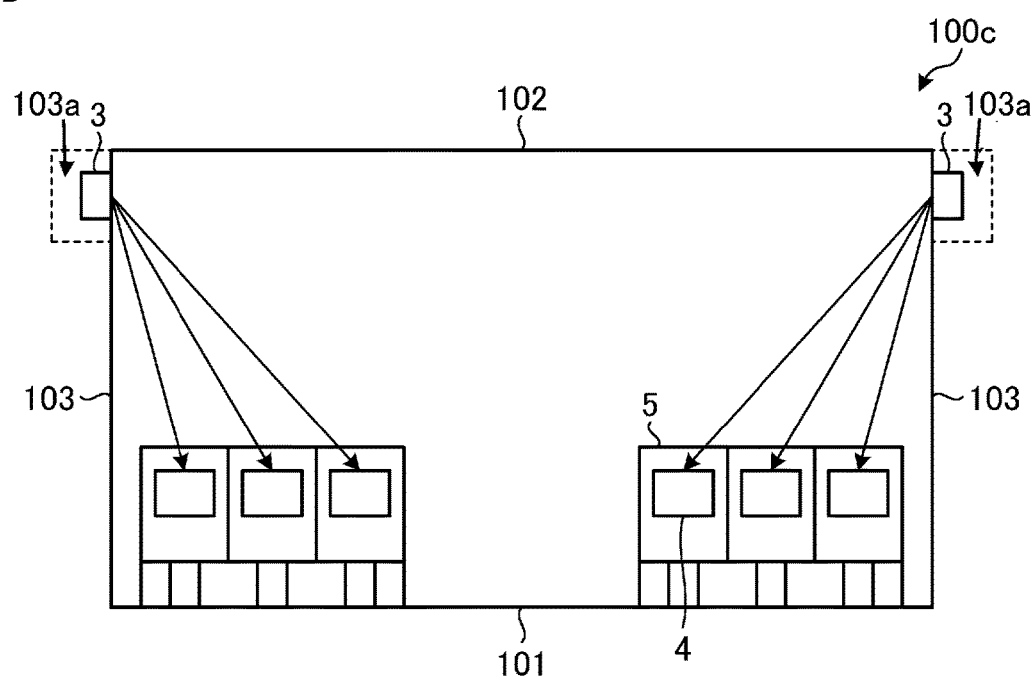
FIG. 21B is a diagram illustrating the example layout in the closed space of the communication network system according to Embodiment 4.
Figure 21C:
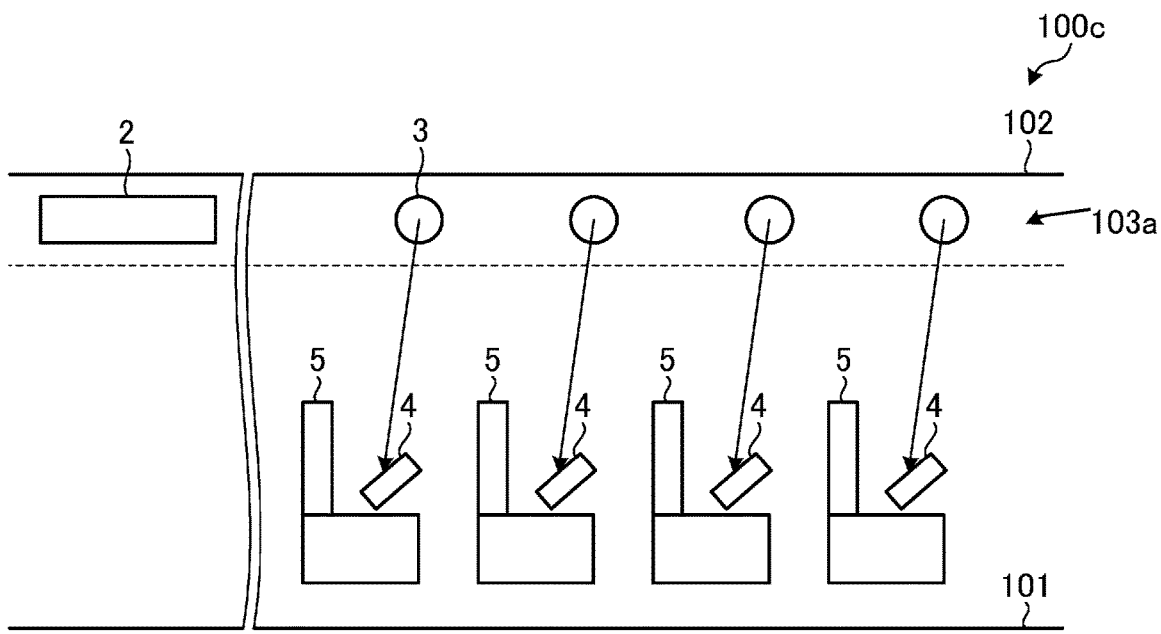
FIG. 21C is a diagram illustrating the example layout in the closed space of the communication network system according to Embodiment 4.

FIGS. 21A, 21B, and 21C are diagrams illustrating an example layout in the closed space of a communication network system according to Embodiment 4. The basic configuration of the communication network system and the configuration of the lighting fixtures are the same as in Embodiment 1, and therefore description thereof is omitted. Note that in this embodiment as well, the lighting fixtures 3, 3a, 3b, 3c, 3d, 3e, 3f, 3g, and 3h described in Embodiment 1 are simply referred to as "lighting fixtures 3" and repeaters 7, 7a, 7b, 7c, 7d, 7e, and 7f described in Embodiment 2 are simply referred to as "repeaters 7".

In this embodiment, as illustrated in FIGS. 21A, 21B, and 21C, a plurality of lighting fixtures 3 are embedded in spaces 103a provided in the walls 103 of a cabin 100c. In the mode illustrated in FIGS. 21A, 21B, and 21C, the lighting fixtures 3 are, for example, exemplified by cabin lights providing, for example, task lighting that illuminates the hands of the passengers seated in the seats 5 in the cabin 100c, ambient lighting that illuminates the whole cabin 100c with indirect illumination of the walls 103 and ceiling 102 of the cabin 100c, or task/ambient lighting providing both task lighting and ambient lighting.

In the example illustrated in FIGS. 21A, 21B, and 21C, the lighting fixtures 3 are provided so as to each correspond to a plurality of seats 5 arrayed in the lateral direction illustrated in FIG. 21A. Beam-formed radio waves radiated from the lighting fixtures 3 reach the terminals 4 of the individual seats 5.

Similarly to as in Embodiment 1, a reflector composed of a dielectric or an array of structures that are very small relative to the wavelength of the radio waves radiated from the lighting fixture 3 or the repeater 7 may be provided on the ceiling 102 above each seat 5. This enables radio waves diffusely reflected by the ceiling 102 and the floor 101 of the cabin 100c to efficiently reach the terminals 4 of the individual seats 5.

In addition, similarly to Embodiment 2, a configuration may be adopted that includes repeaters 7 having a base station function.

Embodiment 5

Figure 22:
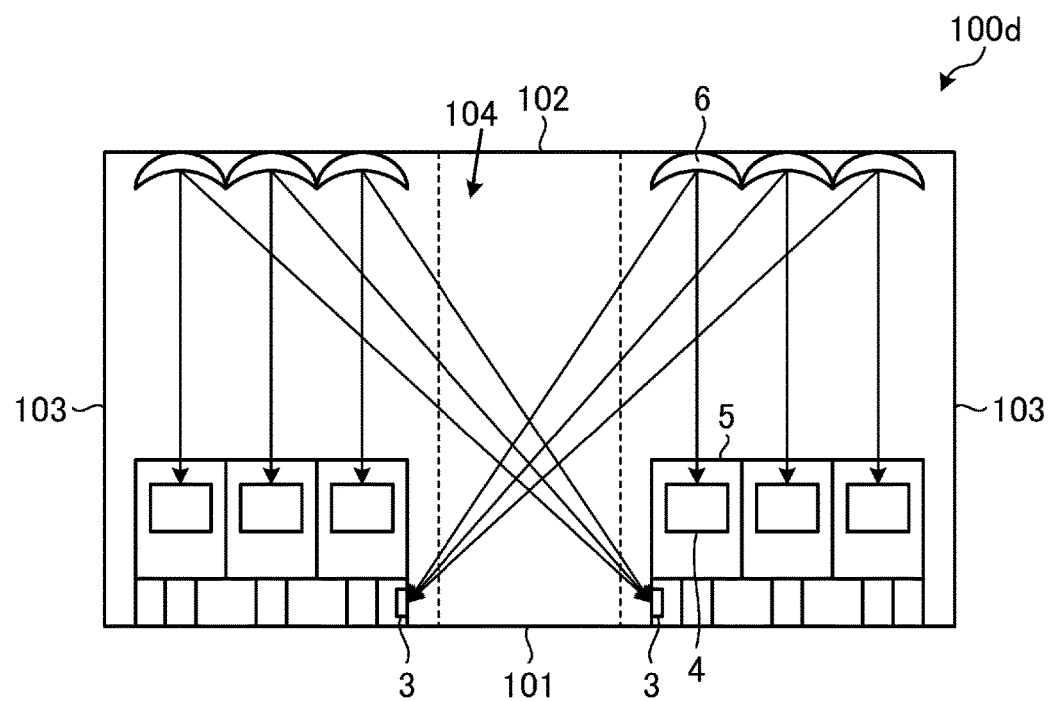
FIG. 22 is a diagram illustrating an example layout in a closed space of a communication network system according to Embodiment 5.

FIG. 22 is a diagram illustrating an example layout in the closed space of a communication network system according to Embodiment 5. The basic configuration of the communication network system and the configuration of the lighting fixtures are the same as in Embodiment 1, and therefore description thereof is omitted. Note that in this embodiment as well, the lighting fixtures 3, 3a, 3b, 3c, 3d, 3e, 3f, 3g, and 3h described in Embodiment 1 are simply referred to as "lighting fixtures 3" and repeaters 7, 7a, 7b, 7c, 7d, 7e, and 7f described in Embodiment 2 are simply referred to as "repeaters 7".

In this embodiment, as illustrated in FIG. 22, a plurality of lighting fixtures 3 are embedded in lower parts of side surfaces of the seats 5 in a cabin 100d. In the mode illustrated in FIG. 22, the lighting fixtures 3 are, for example, exemplified by foot lighting that illuminates the floor 101 of the aisle 104 of the cabin 100d.

In the example illustrated in FIG. 22, the lighting fixtures 3 are provided so as to each correspond to a plurality of seats 5 disposed in the lateral direction illustrated in FIG. 22. Beam-formed radio waves radiated from the lighting fixtures 3 reach the terminals 4 of the individual seats 5.

Similarly to as in Embodiment 1, a reflector composed of a dielectric or an array of structures that are very small relative to the wavelength of the radio waves radiated from the lighting fixture 3 or the repeater 7 may be provided on the ceiling 102 above each seat 5. This enables radio waves diffusely reflected by the ceiling 102 and the floor 101 of the cabin 100d to efficiently reach the terminals 4 of the individual seats 5.

In addition, similarly to Embodiment 2, a configuration may be adopted that includes repeaters 7 having a base station function.

Embodiment 6

Figure 23:
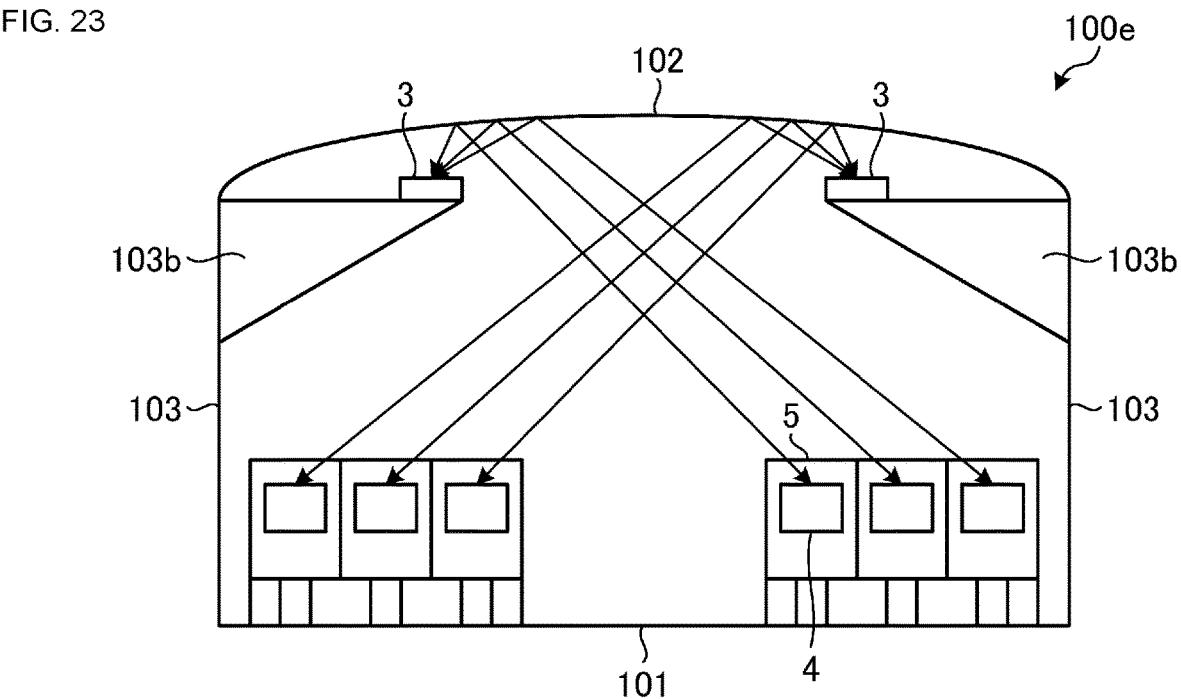
FIG. 23 is a diagram illustrating an example layout in a closed space of a communication network system according to Embodiment 6.

FIG. 23 is a diagram illustrating an example layout in the closed space of a communication network system according to Embodiment 6. The basic configuration of the communication network system and the configuration of the lighting fixtures are the same as in Embodiment 1, and therefore description thereof is omitted. Note that in this embodiment as well, the lighting fixtures 3, 3a, 3b, 3c, 3d, 3e, 3f, 3g, and 3h described in Embodiment 1 are simply referred to as "lighting fixtures 3" and repeaters 7, 7a, 7b, 7c, 7d, 7e, and 7f described in Embodiment 2 are simply referred to as "repeaters 7".

In this embodiment, as illustrated in FIG. 23, a plurality of lighting fixtures 3 are disposed, with radiating surfaces thereof facing upward (toward the ceiling 102), above shelves 103b (for example, compartment boxes in which passengers store their baggage) provided above the seats 5 in a cabin 100e. In the mode illustrated in FIG. 23, the lighting fixtures 3 are, for example, exemplified by cabin lights providing, for example, ambient lighting that illuminates the whole cabin 100e with indirect illumination of the ceiling 102 of the cabin 100e.

In the example illustrated in FIG. 23, the lighting fixtures 3 are provided so as to each correspond to a plurality of seats 5 disposed in the lateral direction illustrated in FIG. 23. Beam-formed radio waves radiated from the lighting fixtures 3 reach the terminals 4 of the individual seats 5.

Similarly to as in Embodiment 1, a reflector composed of a dielectric or an array of structures that are very small relative to the wavelength of the radio waves radiated from the lighting fixture 3 or the repeater 7 may be provided on the ceiling 102 above each seat 5. This enables radio waves diffusely reflected by the ceiling 102 or the floor 101 of the cabin 100e to efficiently reach the terminals 4 of the individual seats 5.

In addition, similarly to Embodiment 2, a configuration may be adopted that includes repeaters 7 having a base station function.

Embodiment 7

Figure 24:
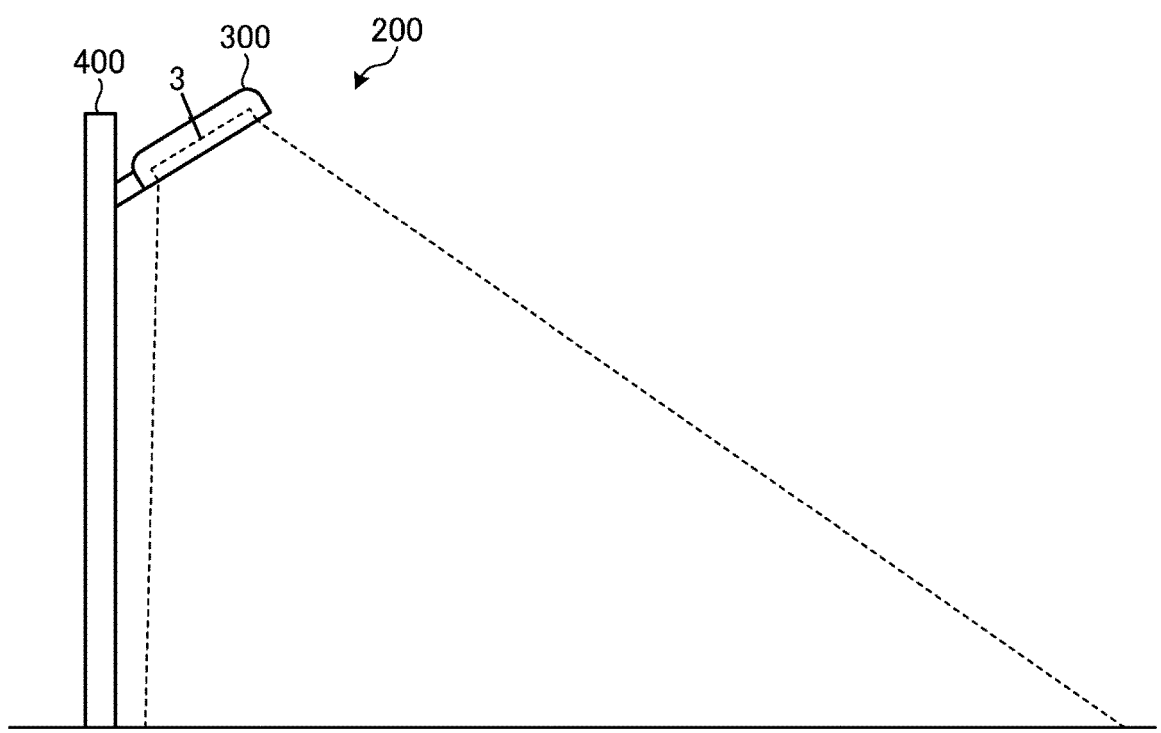
FIG. 24 is a diagram illustrating another application example of a lighting fixture according to Embodiment 7.

FIG. 24 is a diagram illustrating another application example of a lighting fixture according to Embodiment 7. In FIG. 24, an example is illustrated in which the lighting fixture 3 described in Embodiment 1 is applied to a streetlight 200.

In the example illustrated in FIG. 24, in the street light 200, the lighting fixture 3, which is provided with a shade 300, is installed on a support pole 400, such as an electric pole or a telegraph pole, with the radiating surface of the lighting fixture 3 facing downward. This enables the streetlight 200 to be utilized as a hot spot of a communication network system.

The purpose of the embodiments described above is to enable easy understanding of the present disclosure and the embodiments are not to be intended to be construed as limiting the present disclosure. The present disclosure can be modified or improved without necessarily departing from the gist of the disclosure and equivalents to the present disclosure are also included in the present disclosure.

Furthermore, the present disclosure can use the configurations as described above or the following configurations instead of those described above.

(1) A communication network system of an aspect of the present disclosure is a communication network system that distributes information to a plurality of terminals inside a closed space, the communication network system including a network server and a plurality of lighting fixtures that each includes an antenna that transmits and receives millimeter-wave-band communication signals to and from the terminals.

With this configuration, a high-speed and large-capacity information distribution service can be distributed to a large number of terminals inside the closed space while suppressing risk of propagation to outside the closed space.

(2) In the communication network system of (1) described above, the lighting fixtures may be embedded in a floor of an aisle of the closed space.

(3) In the communication network system of (1) described above, the lighting fixtures may be embedded in a ceiling of the closed space.

(4) In the communication network system of (1) described above, the lighting fixtures may be embedded in a wall of the closed space.

(5) In the communication network system of (1) described above, the lighting fixtures may be provided in or on lower parts of side surfaces of seats in the closed space.

(6) In the communication network system of (1) described above, the lighting fixtures may be provided in or on shelves provided above seats in the closed space.

(7) In the communication network system of any one of (2) to (6) described above, a reflector that performs beam forming with respect to a seat provided in the closed space may be provided in or on a ceiling of the closed space.

With this configuration, radio waves radiated from the lighting fixtures can be subjected to beam forming by the reflectors and can reach the terminals of the individual seats.

(8) In the communication network system of (7) described above, the reflector may be formed of a dielectric.

(9) In the communication network system of any one of (1) to (8) described above, the lighting fixtures may be emergency lights in the closed space.

(10) In the communication network system of any one of (1) to (8) described above, the lighting fixtures may be cabin lights in the closed space.

(11) In the communication network system of any one of (1) to (10) described above, the closed space may be an internal space of a fuselage of a passenger plane or a hull of a passenger ship.

(12) The communication network system of any one of (1) to (11) described above may further include a repeater that includes an antenna that transmits and receives millimeter-wave-band communication signals to and from the terminals.

(13) In the communication network system of (12) described above, the repeater may be embedded in a floor of an aisle of the closed space.

(14) In the communication network system of (12) described above, the repeater may be embedded in a ceiling of an aisle of the closed space.

(15) In the communication network system of (12) described above, the repeater may be embedded in a wall of the closed space.

(16) In the communication network system of (12) described above, the repeater may be provided in or on a lower part of a side surface of a seat in the closed space.

(17) In the communication network system of (12) described above, the repeater may be provided in or on a shelf provided above a seat in the closed space.

(18) In the communication network system of any one of (1) to (17) described above, the lighting fixtures may perform optical communication to and from the network server via optical fibers.

(19) In the communication network system of any one of (1) to (17) described above, the lighting fixtures may perform millimeter-wave-band communication to and from the network server in a different frequency band from millimeter-wave-band communication to and from the terminals.

(20) In the communication network system of (19) described above, some or all of the plurality of lighting fixtures may have a repeater function for relaying millimeter-wave-band communication to and from the network server.

(21) In the communication network system of any one of (12) to (17) described above, the repeater may perform optical communication to and from the network server via an optical fiber.

(22) In the communication network system of any one of (12) to (17) described above, the repeater may perform millimeter-wave-band communication to and from the network server in a different frequency band from millimeter-wave-band communication to and from the terminals.

(23) The communication network system of (22) described above may include a plurality of repeaters, each of which being the repeater that includes the antenna that transmits and receives millimeter-wave-band communication signals to and from the terminals, and some or all of the plurality of repeaters may have a repeater function for relaying millimeter-wave-band communication to and from the network server.

(24) A lighting fixture of an aspect of the present disclosure includes a light-emitting element, a cover that allows light emitted by the light-emitting element to pass therethrough, a plurality of antennas that are provided so that radiating surfaces thereof face the cover and that transmit and receive millimeter-wave-band communication signals to and from a terminal, and a base member to which the cover is fixed.

With this configuration, a high-speed and large-capacity information distribution service can be distributed with a lighting fixture serving as a base station.

(25) The lighting fixture of (24) described above may further include an optical cable connector that transmits and receives optical communication signals to and from a network server that distributes information to a plurality of terminals, each of which being the terminal that transmits and receives millimeter-wave-band communication signals to and from the plurality of antennas.

(26) The lighting fixture of (24) described above may include a waveguide antenna that transmits and receives millimeter-wave-band communication signals to and from a network server that distributes information to a plurality of terminals or to and from another lighting fixture, each of the plurality of terminals being the terminal that transmits and receives millimeter-wave-band communication signals to and from the plurality of antennas, in a different frequency band from millimeter-wave-band communication to and from the terminal.

(27) The lighting fixture of (24) described above may include a horn antenna that transmits and receives millimeter-wave-band communication signals to and from a network server that distributes information to a plurality of terminals or to and from another lighting fixture, each of the plurality of terminals being the terminal that transmits and receives millimeter-wave-band communication signals to and from the plurality of antennas, in a different frequency band from millimeter-wave-band communication to and from the terminal.

With the present disclosure, there can be obtained a communication network system and a lighting fixture capable of providing a high-speed and large-capacity information distribution service to a large number of terminals inside a closed space while suppressing the risk of propagation to outside the closed space.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. A communication network system configured to distribute information to a plurality of terminals inside a closed space, the communication network system comprising:
   a network server; and
   a plurality of lighting fixtures that each comprise an antenna configured to transmit and receive millimeter-wave-band communication signals to and from the terminals,
   wherein the plurality of lighting fixtures are configured to transmit and receive optical communication signals to and from the network server via optical fibers that directly connect the plurality of lighting fixtures to the network server.

2. The communication network system according to claim 1, wherein the lighting fixtures are embedded in a floor of an aisle, a ceiling, or a wall of the closed space.

3. The communication network system according to claim 1, wherein the lighting fixtures are in or on lower halves of side surfaces of seats in the closed space.

4. The communication network system according to claim 1, wherein the lighting fixtures are in or on shelves that are above seats in the closed space.

5. The communication network system according to claim 2, further comprising a reflector configured to perform beam forming with respect to a seat in the closed space, the reflector being in or on the ceiling of the closed space.

6. The communication network system according to claim 5, wherein the reflector is at least in part a dielectric material.

7. The communication network system according to claim 1, wherein the lighting fixtures are emergency lights or cabin lights in the closed space.

8. The communication network system according to claim 1, wherein the closed space is an internal space of a fuselage of a passenger plane or a hull of a passenger ship.

9. The communication network system according to claim 1, further comprising:
   a repeater comprising an antenna configured to transmit and receive millimeter-wave-band communication signals to and from the terminals.

10. The communication network system according to claim 9, wherein the repeater is embedded in a floor, a ceiling, or a wall of an aisle of the closed space.

11. The communication network system according to claim 9, wherein the repeater is in or on a lower half of a side surface of a seat in the closed space.

12. The communication network system according to claim 9, wherein the repeater is in or on a shelf that is above a seat in the closed space.

13. The communication network system according to claim 1, wherein the lighting fixtures are configured to transmit and receive millimeter-wave-band communication signals to and from the network server in a frequency band that is different than the millimeter-wave-band communication signals transmitted to and received from the terminals.

14. The communication network system according to claim 13, wherein at least one of the lighting fixtures has a repeater function and is further configured to relay millimeter-wave-band communication to and from the network server.

15. The communication network system according to claim 9, wherein the repeater is configured to transmit and receive optical communication signals to and from the network server via optical fiber.

16. The communication network system according to claim 9, wherein the repeater is configured to transmit and receive millimeter-wave-band communication signals to and from the network server in a frequency band that is different than the millimeter-wave-band communication signals transmitted to and received from the terminals.

17. A lighting fixture comprising:
   a light-emitting element;
   a cover that allows light emitted by the light-emitting element to pass therethrough;
   a plurality of antennas, each antenna having a radiating surface that faces the cover and that is configured to transmit and receive millimeter-wave-band communication signals to and from a terminal;
   an optical cable connector configured to transmit and receive optical communication signals to and from a network server, the network server being configured to distribute information to a plurality of terminals, the plurality of terminals being configured to transmit and receive millimeter-wave-band communication signals to and from the plurality of antennas; and
   a base to which the cover is fixed.

18. The lighting fixture according to claim 17, further comprising:
   a waveguide antenna or a horn antenna configured to transmit and receive millimeter-wave-band communication signals to and from a network server, the network server being configured to distribute information to a plurality of terminals, or to and from another lighting fixture, in a frequency band that is different than the millimeter-wave-band communication signals transmitted to and received from the terminal.

* * * * *